US012588041B2

(12) United States Patent
Park et al.

(10) Patent No.: US 12,588,041 B2
(45) Date of Patent: Mar. 24, 2026

(54) METHOD AND APPARATUS FOR TRANSMITTING AND RECEIVING SIDELINK INFORMATION IN UNLICENSED BAND IN FRAME-BASED CHANNEL ACCESS METHOD

(71) Applicant: SAMSUNG ELECTRONICS CO., LTD., Suwon-si (KR)

(72) Inventors: Sungjin Park, Suwon-si (KR); Hyunseok Ryu, Suwon-si (KR); Hyewon Yang, Suwon-si (KR); Jaewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 256 days.

(21) Appl. No.: 18/365,095

(22) Filed: Aug. 3, 2023

(65) Prior Publication Data

US 2024/0049261 A1 Feb. 8, 2024

(30) Foreign Application Priority Data

Aug. 3, 2022 (KR) ......................... 10-2022-0096942

(51) Int. Cl.
    *H04W 72/40* (2023.01)
    *H04W 16/14* (2009.01)
    *H04W 74/0808* (2024.01)
(52) U.S. Cl.
    CPC ........... *H04W 72/40* (2023.01); *H04W 16/14* (2013.01); *H04W 74/0808* (2013.01)
(58) Field of Classification Search
    CPC ..... H04W 72/00; H04W 72/04; H04W 72/12; H04W 72/40; H04W 74/0833; H04W 16/14; H04W 56/00; H04W 56/001; H04W 74/0808; H04W 74/006; H04W 4/40–48; H04W 72/02; H04W 72/20; H04W 72/30; H04W 74/002; H04W 74/0875;

(Continued)

(56) References Cited

U.S. PATENT DOCUMENTS

2020/0396767 A1 12/2020 Talarico et al.
2022/0046708 A1* 2/2022 Sun ........................ H04W 16/14
(Continued)

FOREIGN PATENT DOCUMENTS

WO 2021159434 A1 8/2021
WO 2022083972 A1 4/2022

OTHER PUBLICATIONS

International Search Report and Written Opinion of the International Searching Authority dated Nov. 6, 2023, in connection with International Application No. PCT/KR2023/011321, 7 pages.

*Primary Examiner* — Thomas R Cairns
*Assistant Examiner* — Shivakrishna Vallamdasu

(57) ABSTRACT

The disclosure relates to a 5G or 6G communication system for supporting a higher data transmission rate. A method performed by a user equipment (UE) in a communication system includes obtaining one or more configurations for a fixed frame period (FFP) and an offset associated with a frame-based channel access, identifying a configuration for the FFP and the offset among the one or more configurations, identifying idle duration corresponding to the FFP associated with the configuration, and transmitting a sidelink channel in consideration of the idle duration.

18 Claims, 18 Drawing Sheets

(58) Field of Classification Search
CPC ... H04L 1/1822; H04L 1/1861; H04L 1/1864;
H04L 1/189
See application file for complete search history.

(56) References Cited

U.S. PATENT DOCUMENTS

| | | |
|---|---|---|
| 2022/0070918 A1 | 3/2022 | Fan et al. |
| 2022/0110057 A1* | 4/2022 | Wang .................. H04W 52/028 |
| 2022/0240296 A1 | 7/2022 | Lee |
| 2023/0344563 A1* | 10/2023 | Huang ................ H04W 74/002 |
| 2023/0345364 A1* | 10/2023 | Park ...................... H04W 72/40 |
| 2024/0023043 A1* | 1/2024 | Jiao ....................... H04W 76/14 |

* cited by examiner (a) in-coverage scenario (b) partial coverage scenario (c) out-of-coverage scenario (d) inter-cell SL communication scenario

FIG. 2

(a) unicast SL communication (b) groupcast SL communication

METHOD AND APPARATUS FOR TRANSMITTING AND RECEIVING SIDELINK INFORMATION IN UNLICENSED BAND IN FRAME-BASED CHANNEL ACCESS METHOD

CROSS-REFERENCE TO RELATED APPLICATION

This application is based on and claims priority under 35 U.S.C. 119 to Korean Patent Application No. 10-2022-0096942, filed on Aug. 3, 2022, in the Korean Intellectual Property Office, the disclosure of which is herein incorporated by reference in its entirety.

BACKGROUND

1. Field

The disclosure relates to a method for transmitting and receiving sidelink information in a wireless communication system and, more particularly, to a method and an apparatus for configuring sidelink information and transmitting and receiving the same in an unlicensed band in a frame-based channel access method.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/ service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

The disclosure relates to a method for configuring sidelink broadcast information in a sidelink communication system and a method and an apparatus for transmitting and receiving the same.

According to an embodiment of the present disclosure, a method performed by a user equipment (UE) in a communication system is provided. The method comprises obtaining one or more configurations for a fixed frame period (FFP) and an offset associated with a frame-based channel access; identifying a configuration for the FFP and the offset among the one or more configurations; identifying idle duration corresponding to the FFP associated with the configuration; and transmitting a sidelink channel in consideration of the idle duration.

According to an embodiment of the present disclosure, a user equipment (UE) in a communication system is provided. The UE comprises a transceiver; and a controller configured to: obtain one or more configurations for a fixed frame period (FFP) and an offset associated with a frame-based channel access; identify a configuration for the FFP and the offset among the one or more configurations; identify idle duration corresponding to the FFP associated with the configuration; and transmit a sidelink channel in consideration of the idle duration.

According to a proposed embodiment, it is possible to improve efficiency in a method for configuring sidelink broadcast information in a sidelink communication system and a process for transmitting and receiving the same.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 illustrates a vehicle-to-everything (V2X) communication method through a sidelink to which an embodiment of the disclosure is applied;

FIG. 5 illustrates a frame structure of a sidelink system according to an embodiment of the disclosure;

FIG. 11 illustrates an example of a sidelink structure operating in a frame-based channel access method according to an embodiment of the disclosure;

FIG. 12 illustrates another example of a sidelink structure operating in a frame-based channel access method according to an embodiment of the disclosure

DETAILED DESCRIPTION

Figure 1A:
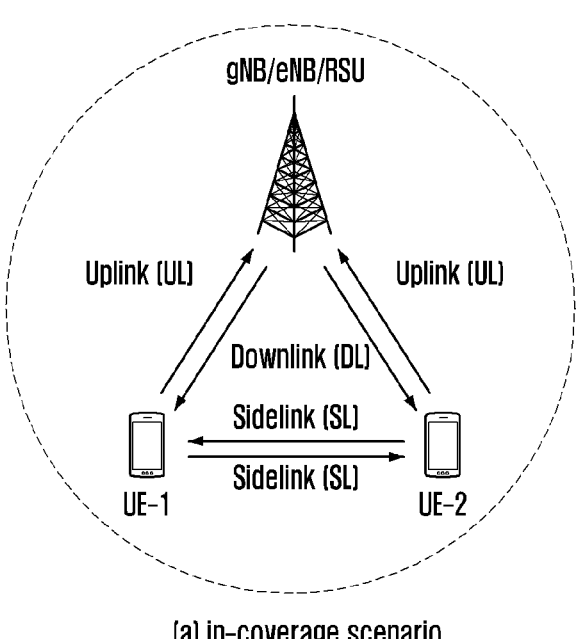
FIG. 1A illustrates an example of a system for explaining an embodiment of the disclosure.

FIGS. 1A through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings. It should be noted that, in the drawings, the same or like elements are designated by the same or like reference signs as much as possible. Furthermore, a detailed description of known functions or configurations that may make the subject matter of the disclosure unclear will be omitted.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Furthermore, the "unit" in the embodiments may include one or more processors.

The following detailed description of embodiments of the disclosure is mainly directed to New RAN (NR) as a radio access network and Packet Core as a core network (5G system, 5G Core Network, or next generation core (NG Core)) which are specified in the 5G mobile communication standards defined by the 3rd generation partnership project long term evolution (3GPP LTE) that is a mobile communication standardization group, but based on determinations by those skilled in the art, the main idea of the disclosure may be applied to other communication systems having similar technical backgrounds through some modifications without significantly departing from the scope of the disclosure.

In the 5G system, a network data collection and analysis function (NWDAF) that is a network function for analyzing and providing data collected by a 5G network may be defined to support network automation. The NWDAF may collect information from the 5G network, store and analyze the collected information, and provide the result to an unspecified network function (NF), and the analysis result may be independently used by each NF.

In the following description, some of terms and names defined in the 3GPP standards (standards for 5G, NR, LTE, or similar systems) may be used for the sake of descriptive convenience. However, the disclosure is not limited by these terms and names, and may be applied in the same way to systems that conform other standards.

Furthermore, in the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

To meet the demand for wireless data traffic having increased since deployment of 4G communication systems, efforts have been made to develop an improved 5G (new radio (NR)) communication system. The 5G communication system has been designed to support ultrahigh frequency (mmWave) bands (e.g., 28 GHz frequency bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In the 5G communication system supports, unlike LTE, various subcarrier spacings such as 30 kHz, 60 kHz, and 120 kHz, as well as 15 kHz, are supported, and a physical control channel uses polar coding and a physical data channel uses a low density parity check (LDPC). Furthermore, as waveforms for uplink transmission, not only a CP-OFDM but also a DFT-S-OFDM are used. While hybrid ARQ (HARQ) retransmission in units of transport blocks (TBs) are supported in LTE, HARQ retransmission based on a code block group (CBG) including a bundle of a plurality of code blocks (CBs) may be additionally supported in 5G.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology. As described above, a communication system may provide multiple services to a user, and in order to provide these multiple services to a user, there is a need for a method that can provide each service in the same time interval according to the characteristics thereof and a device using the same. Various services to be provided in 5G communication systems are being studied, and one of them is a service that satisfies requirements for low latency and high reliability.

In vehicle communication, LTE-based V2X has been completely standardized based on a device-to-device (D2D) communication structure in 3GPP Rel-14 and Rel-15, and efforts to develop V2X based on 5G New Radio (NR) are currently underway. NR V2X is expected to support unicast communication, groupcast (or multicast) communication, and broadcast communication between UEs. Further, unlike LTE V2X aimed at transmitting and receiving basic safety information required for road driving of a vehicle, NR V2X is intended to provide an advanced service, such as platooning, advanced driving, an extended sensor, and remote driving.

Since the advanced service requires a high data rate, an NR V2X system may need a relatively wide bandwidth compared to a conventional 4G LTE V2X system. To this end, an operation in a high frequency band needs to be supported, and a coverage problem caused by a frequency characteristic needs to be solved through analog beamforming. In an analog beamforming system, a method and an apparatus for obtaining beam information between a transmission UE and reception UEs are required.

An embodiment of the disclosure is proposed to support the foregoing scenario, and is intended to provide a method for configuring sidelink broadcast information to perform sidelink synchronization between UEs and a method and an apparatus for transmitting and receiving the sidelink broadcast information.

Figure 1B:
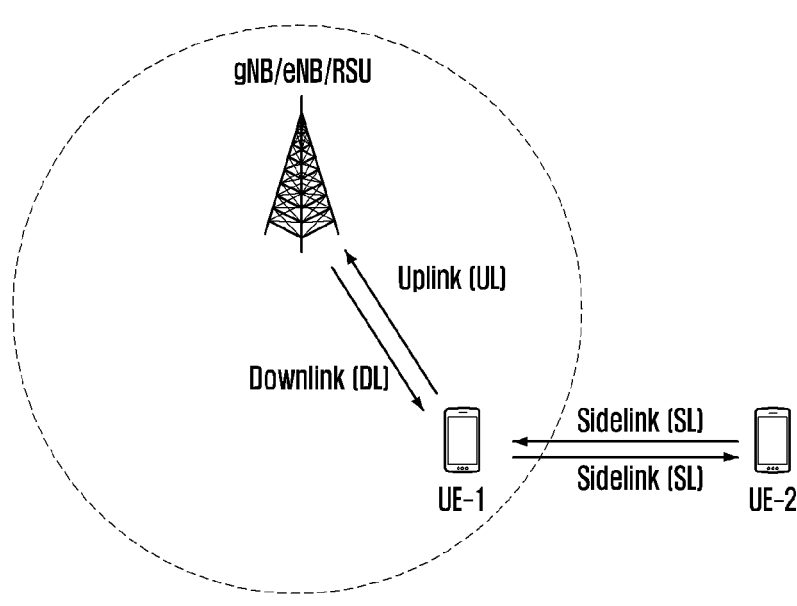
FIG. 1B illustrates another example of a system for explaining an embodiment of the disclosure.
Figure 1C:
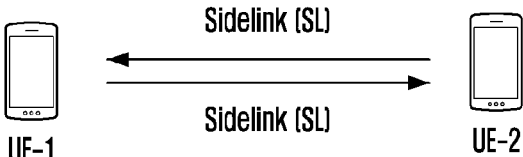
FIG. 1C illustrates yet another example of a system for explaining an embodiment of the disclosure.
Figure 1D:
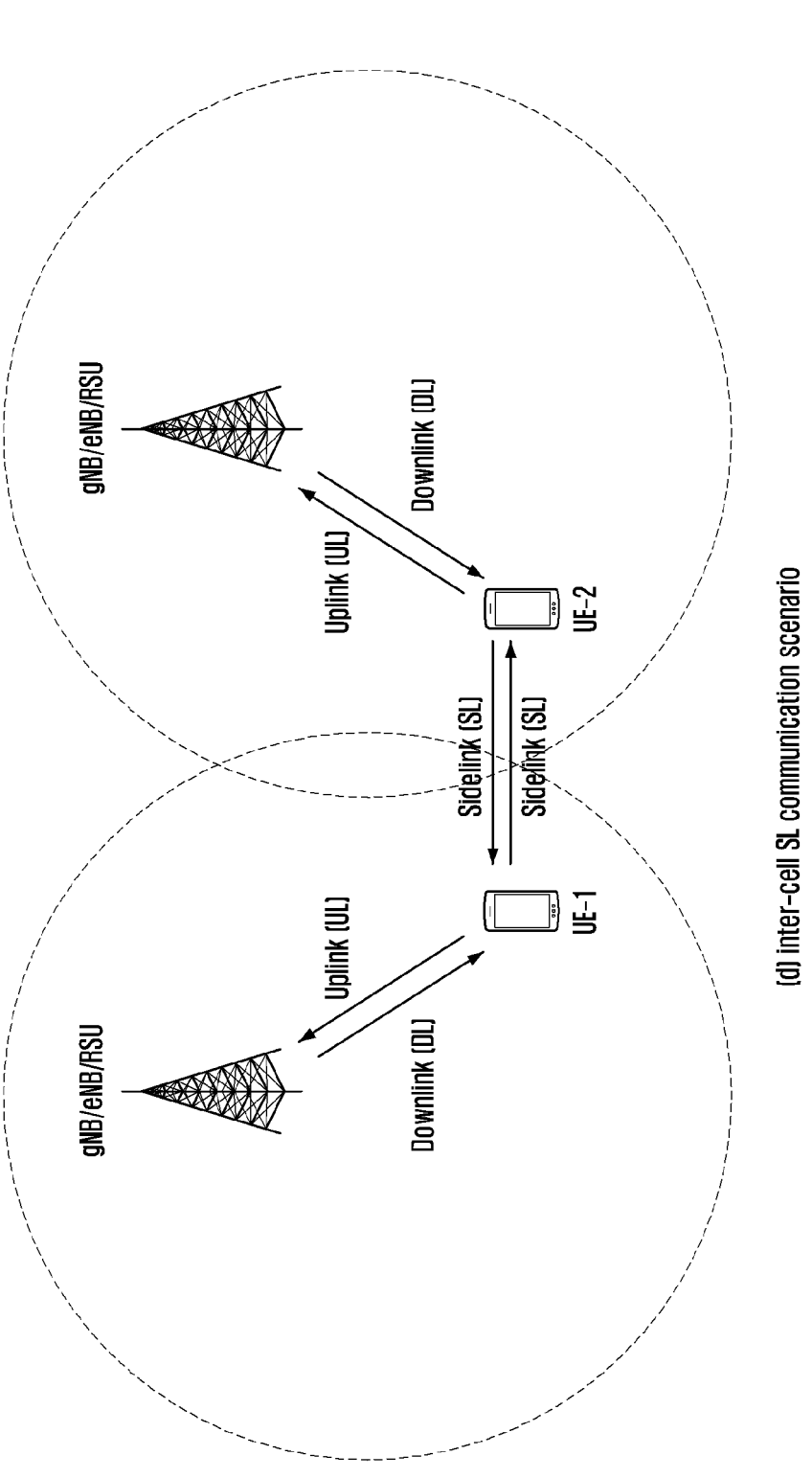
FIG. 1D illustrates still another example of a system for explaining an embodiment of the disclosure.

FIG. 1A illustrates a system for explaining an embodiment of the disclosure, FIG. 1B illustrates a system for explaining an embodiment of the disclosure, FIG. 1C illustrates a system for explaining an embodiment of the disclosure, and FIG. 1D illustrates a system for explaining an embodiment of the disclosure.

FIG. 1A illustrates an example in which all V2X UEs (UE-1 and UE-2) are located within coverage of a base station.

All V2X UEs located within the coverage of the base station may receive data and control information from the base station through a downlink (DL), or may transmit data and control information to the base station through an uplink (UL). The data and the control information may be data and control information for V2X communication. Alternatively, the data and the control information may be data and control information for general cellular communication. Further, the V2X UEs may transmit and receive data and control information for V2X communication through a sidelink (SL).

FIG. 1B illustrates an example in which UE-1 among V2X UEs is located within coverage of a base station and UE-2 is located outside the coverage of the base station. The example according to FIG. 1B may be an example of partial coverage.

UE-1 located within the coverage of the base station may receive data and control information from the base station through a downlink, or may transmit data and control information to the base station through an uplink.

UE-2 located outside the coverage of the base station is unable to receive data and control information from the base station through a downlink, and is unable to transmit data and control information to the base station through an uplink.

UE-2 may transmit and receive data and control information for V2X communication to and from UE-1 through a sidelink.

FIG. 1C illustrates an example in which all V2X UEs are located outside coverage of a base station.

UE-1 and UE-2 are unable to receive data and control information from the base station through a downlink, and are unable to transmit data and control information to the base station through an uplink.

UE-1 and UE-2 may transmit and receive data and control information for V2X communication through a sidelink.

FIG. 1D illustrates a scenario in which V2X communication is performed between UEs located in different cells. Specifically, FIG. 1D illustrates a case in which a V2X transmission UE and a V2X reception UE are connected to different base stations (RRC-connected state) or camp on the different base stations (RRC-disconnected state, that is, RRC idle state). In this case, UE-1 may be the V2X transmission UE, and UE-2 may be the V2X reception UE. Alternatively, UE-1 may be the V2X reception UE, and UE-2 may be the V2X transmission UE. UE-1 may receive a V2X-specific system information block (SIB) from a base station which UE-1 is connected to (or camps on), and UE-2 may receive a V2X-specific SIB from a different base station which UE-2 is connected to (or camps on) Here, information of the V2X-specific SIB received by UE-1 and information of the V2X-specific SIB received by UE-2 may be the same or different from each other. When the pieces of information of the SIBs are different from each other, UE-1 and UE-2 may receive different pieces of information for sidelink communication via a SIB respectively from the base stations which UE-1 and UE-2 are connected to (or camp on). In this case, the pieces of information need to be unified to perform sidelink communication between the UEs located in the different cells.

Although FIG. 1A to FIG. 1D show a V2X system including two UEs (UE-1 and UE-2) for convenience of explanation, the disclosure is not limited thereto. In addition, an uplink and a downlink between a base station and V2X UEs may be referred to as a Uu interface, and a sidelink between V2X UEs may be referred to as a PC5 interface. Therefore, the foregoing terms may be interchangeably used in the disclosure.

In the disclosure, a UE may refer to a UE supporting device-to-device (D2D) communication, a vehicle supporting vehicle-to-vehicle (V2V) communication, a vehicle or a handset (i.e., smartphone) of a pedestrian supporting vehicle-to-pedestrian (V2P) communication, a vehicle supporting vehicle-to-network (V2N) communication, or a vehicle supporting vehicle-to-infrastructure (V2I) communication. Further, in the disclosure, a UE may refer to a roadside unit (RSU) including a UE function, an RSU including a base station function, or an RSU including part of a base station function and part of a UE function.

In the disclosure, V2X communication may refer to communication between UEs, communication between vehicles, or communication between a vehicle and a pedestrian, and may be used interchangeably with sidelink communication.

In the disclosure, it is predefined that a base station may be a base station supporting both V2X communication and general cellular communication, or a base station supporting only V2X communication. In this case, the base station may refer to a 5G base station (gNB), a 4G base station (eNB), or a roadside unit (RSU). Therefore, unless specified otherwise in the disclosure, the base station and the RSU may be used as the same concept, and may thus be interchangeably used.

Figure 2:
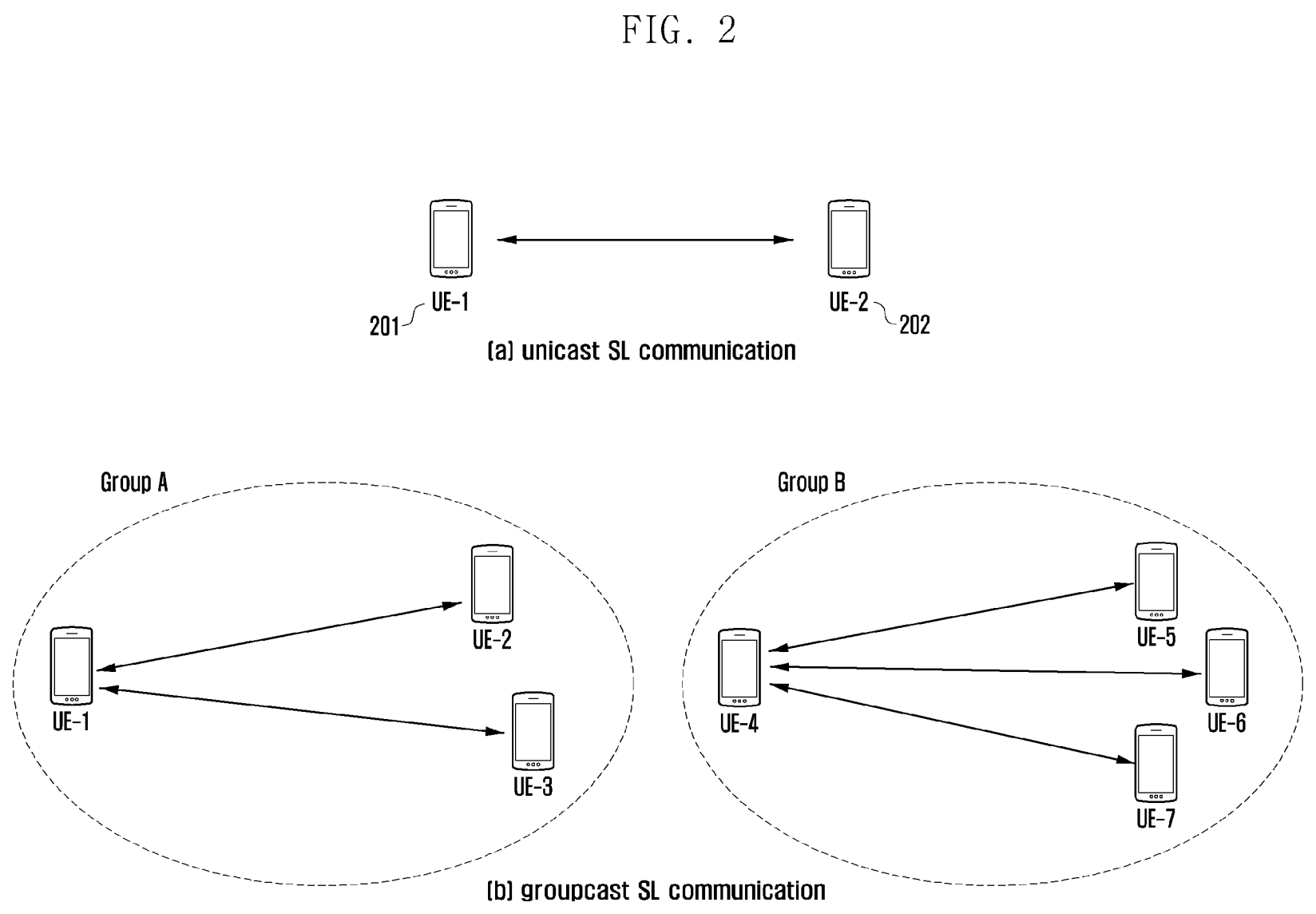

FIG. 2 illustrates a V2X communication method through a sidelink to which an embodiment of the disclosure is applied.

Referring to FIG. 2(a), a transmission UE (UE-1) and a reception UE (UE-2) may perform one-to-one communication, which may be referred to as unicast communication.

Referring to FIG. 2(b), a transmission UE (UE-1 or UE-4) and reception UEs (UE-2 and UE-3 or UE-5, UE-6, and UE-7) may perform one-to-many communication, which may be referred to as groupcast or multicast.

In FIG. 2B, UE-1, UE-2, and UE-3 may form one group (group A) to perform groupcast communication, and UE-4, UE-5, UE-6, and UE-7 may form another group (group B) to perform groupcast communication. Each UE may perform groupcast communication only within a group to which the UE belongs, and communication between different groups may be performed through one method of unicast communication, groupcast communication, or broadcast communication. Although FIG. 2B shows that two groups are formed, the disclosure is not limited thereto.

Although not shown in FIG. 2, V2X UEs may perform broadcast communication. Broadcast communication refers to a case in which all V2X UEs receive data and control information transmitted by a V2X transmission UE through a sidelink. For example, in FIG. 2B, assuming UE-1 as a transmission UE for broadcast, all UEs (UE-2, UE-3, UE-4, UE-5, UE-6, and UE-7) may be reception UEs that receive data and control information transmitted by UE-1.

Sidelink unicast, groupcast, and broadcast communication methods according to the embodiment of the disclosure may be supported in in-coverage, partial-coverage, and out-of-coverage scenarios.

In a sidelink system, the following methods may be used for resource allocation.

(1) Resource Allocation Mode 1

Resource allocation mode 1 refers to a scheduled resource allocation method by a base station. Specifically, in resource allocation mode 1, the base station may allocate a resource used for sidelink transmission to RRC-connected UEs in a dedicated scheduling manner. The scheduled resource allocation method may be effective in interference management and resource pool management (dynamic allocation and/or semi-persistent transmission (SPS)) in that the base station is able to manage sidelink resources. When an RRC-connected UE has data to transmit to a different UE(s), the RRC-connected UE may transmit information for notifying the base station that there is the data to transmit to the different UE(s) by using a radio resource control (RRC) message or a medium access control (MAC) control element (CE). For example, the RRC message may be a sidelink UE information (SidelinkUEInformation) or UE assistance information (UEAssistanceInformation) message. The MAC CE may be a buffer status report (BSR) MAC CE scheduling request (SR) including at least one of an indicator indicating that the MAC CE is a BSR for V2X communication and information about a size of data buffered for sidelink communication. The method of resource allocation mode 1 may be applied when a V2X transmission UE is within coverage of the base station because the base station schedules a resource for a sidelink transmission UE.

(2) Resource Allocation Mode 2

In mode 2, a sidelink transmission UE may autonomously select a resource (UE autonomous resource selection). Specifically, mode 2 is a method in which a base station provides a sidelink transmission and reception resource pool for a sidelink to the UE through system information or an RRC message (e.g., an RRCReconfiguration message or a PC5-RRC message), and the transmission UE having received the transmission and reception resource pools selects a resource pool and a resource according to a set rule. In this example, since the base station provides configuration information about the sidelink transmission and reception resource pool, the method may be applied when the sidelink transmission UE and a reception UE are within coverage of the base station. When the sidelink transmission UE and the reception UE are located outside the coverage of the base station, the sidelink transmission UE and the reception UE may perform an operation of mode 2 in a preconfigured transmission and reception resource pool. The UE autonomous resource selection method may include zone mapping, sensing-based resource selection, random selection, and the like.

(3) Additionally, even though a UE is located in coverage of a base station, resource allocation or resource selection may not be performed in the scheduled resource allocation or UE autonomous resource selection mode, in which case the UE may perform sidelink communication through a preconfigured sidelink transmission and reception resource pool.

The sidelink resource allocation methods according to the foregoing embodiment of the disclosure may be applied to various embodiments of the disclosure.

Figure 3:
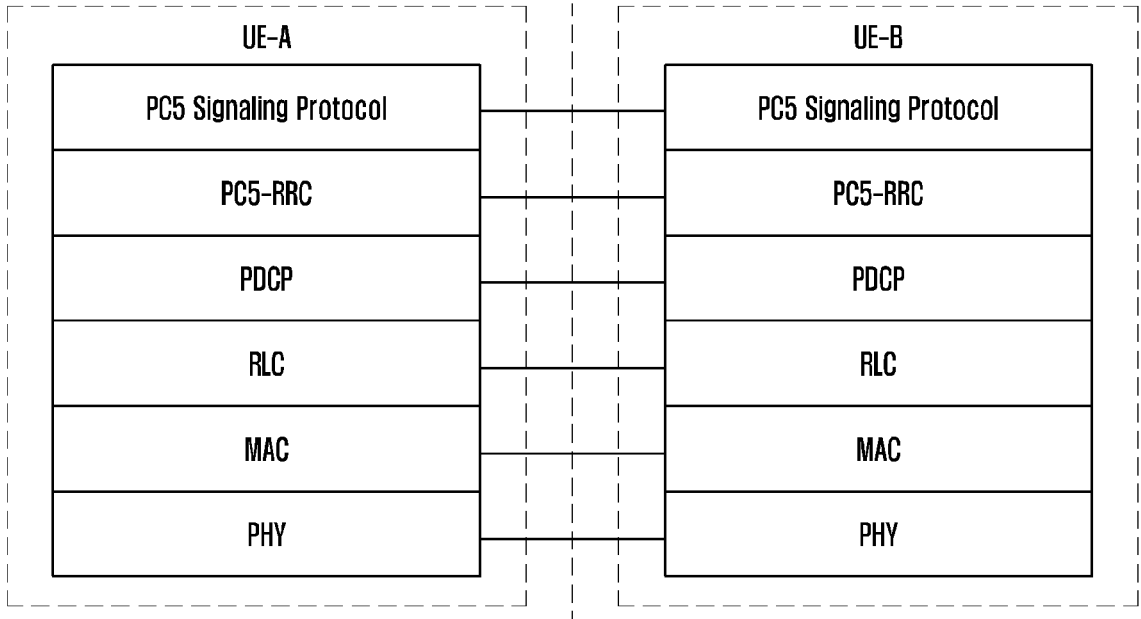
FIG. 3 illustrates a protocol of a sidelink UE to which an embodiment of the disclosure is applied.

FIG. 3 illustrates a protocol of a sidelink UE to which an embodiment of the disclosure is applied.

Although not shown in FIG. 3, application layers of UE-A and UE-B may perform service discovery. Here, the service discovery may include discovery for which sidelink communication method (unicast, groupcast, or broadcast) each UE performs. Therefore, in FIG. 3, UE-A and UE-B may be assumed to recognize that UE-A and UE-B perform a unicast communication method via a service discovery process performed in the application layers. The sidelink UEs may obtain information about a source identifier (ID) and a destination identifier (ID) for sidelink communication in the service discovery process.

When the service discovery process is completed, PC-5 signaling protocol layers illustrated in FIG. 3 may perform a direct link connection setup procedure between the UEs. Here, pieces of security configuration information for direct communication between the UEs may be exchanged.

When direct link connection setup between the UEs is completed, PC-5 RRC layers of FIG. 3 may perform a PC-5 radio resource control (RRC) configuration procedure between the UEs. Here, capability information about UE-A and UE-B may be exchanged, and pieces of access stratum (AS) layer parameter information for unicast communication may be exchanged.

When the PC-5 RRC configuration procedure is completed, UE-A and UE-B may perform unicast communication.

The foregoing example has been described with unicast communication for illustration, but may extend to groupcast communication. For example, when UE-A, UE-B, and UE-C, which is not shown in FIG. 3, perform groupcast communication, UE-A and UE-B may perform service discovery, direct link setup between the UEs, and a PC-5 RRC configuration procedure for unicast communication as mentioned above. Further, UE-A and UE-C may also perform service discovery, direct link setup between the UEs, and a PC-5 RRC configuration procedure for unicast communication. Finally, UE-B and UE-C may perform service discovery, direct link setup between the UEs, and a PC-5 RRC configuration procedure for unicast communication. That is, instead of performing a separate PC-5 RRC configuration procedure for the groupcast communication, a PC-5 RRC configuration procedure for unicast communication may be performed in each pair of a transmission UE and a reception UE participating in the groupcast communication. However, in a groupcast method, the PC5 RRC configuration procedure for unicast communication may not always need to be performed. For example, there may be a scenario of groupcast communication performed without PC5 RRC connection establishment, in which case a PC5 connection establishment procedure for unicast transmission may be omitted.

The PC-5 RRC configuration procedure for unicast or groupcast communication may be applied to all of the in-coverage, partial coverage, and out-of-coverage scenarios illustrated in FIG. 1A to FIG. 1D. When UEs to perform unicast or groupcast communication exist within coverage of a base station, the UEs may perform the PC-5 RRC configuration procedure before or after performing downlink or uplink synchronization with the base station.

Figure 4:
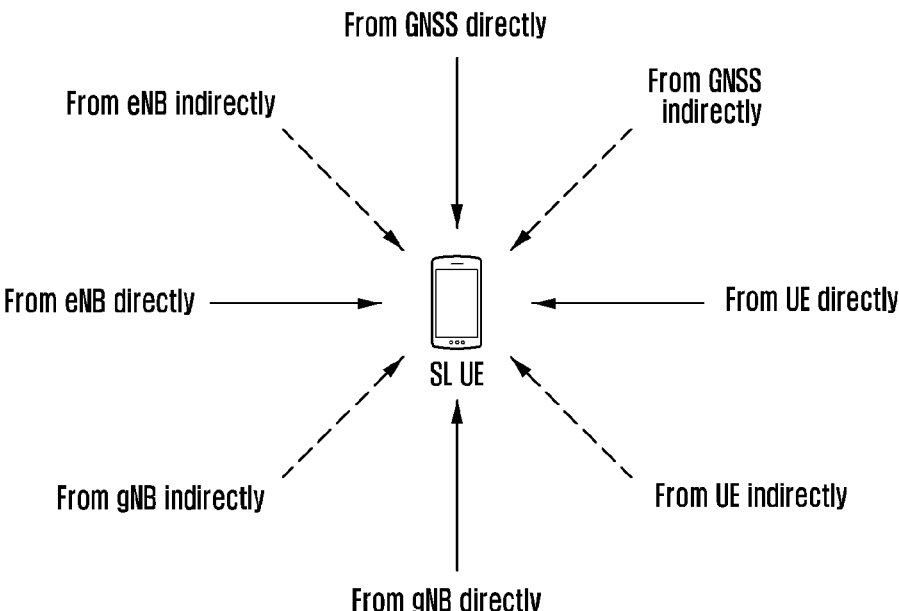
FIG. 4 illustrates types of synchronization signals that a sidelink UE may receive to which an embodiment of the disclosure is applied.

FIG. 4 illustrates types of synchronization signals that a sidelink UE may receive to which an embodiment of the disclosure is applied.

Specifically, the following sidelink synchronization signals may be received from various sidelink synchronization sources.

The sidelink UE may directly receive a synchronization signal from a global navigation satellite system (GNSS) or a global positioning system (GPS).

In this case, a sidelink synchronization source may be the GNSS.

The sidelink UE may indirectly receive a synchronization signal from the global navigation satellite system (GNSS) or the global positioning system (GPS).

Receiving the synchronization signal indirectly from the GNSS may refer to a case in which sidelink UE-A receives a sidelink synchronization signal (SLSS) transmitted by sidelink UE-1 that is directly synchronized with the GNSS. Here, sidelink UE-A may receive the synchronization signal from the GNSS through two hops. In another example, sidelink UE-2 that is synchronized with an SLSS transmitted by sidelink UE-1 that is synchronized with the GNSS may transmit an SLSS. Sidelink UE-A receiving the SLSS may receive the synchronization signal from the GNSS through three hops. Similarly, sidelink UE-A may receive a synchronization signal from the GNSS through three or more hops.

In this case, a sidelink synchronization source may be another sidelink UE synchronized with the GNSS.

The sidelink UE may directly receive a synchronization signal from an LTE base station (eNB).

The sidelink UE may directly receive a primary synchronization signal (PSS)/secondary synchronization signal (SSS) transmitted from the LTE base station.

In this case, a sidelink synchronization source may be the eNB.

The sidelink UE may indirectly receive a synchronization signal from the LTE base station (eNB).

Receiving the synchronization signal indirectly from the eNB may refer to a case in which sidelink UE-A receives an SLSS transmitted by sidelink UE-1 that is directly synchronized with the eNB. Here, sidelink UE-A may receive the synchronization signal from the eNB through two hops. In another example, sidelink UE-2 that is synchronized with an SLSS transmitted by sidelink UE-1 that is directly synchronized with the eNB may transmit an SLSS. Sidelink UE-A receiving the SLSS may receive the synchronization signal from the eNB through three hops. Similarly, sidelink UE-A may receive a synchronization signal from the eNB through three or more hops.

In this case, a sidelink synchronization source may be another sidelink UE synchronized with the eNB.

The sidelink UE may indirectly receive a synchronization signal from an NR base station (gNB).

Receiving the synchronization signal indirectly from the gNB may refer to a case in which sidelink UE-A receives an SLSS transmitted by sidelink UE-1 that is directly synchronized with the gNB. Here, sidelink UE-A may receive the synchronization signal from the gNB through two hops. In another example, sidelink UE-2 that is synchronized with an SLSS transmitted by sidelink UE-1 that is directly synchronized with the gNB may transmit an SLSS. Sidelink UE-A receiving the SLSS may receive the synchronization signal from the gNB through three hops. Similarly, sidelink UE-A may receive a synchronization signal from the gNB through three or more hops.

In this case, a sidelink synchronization source may be another sidelink UE synchronized with the gNB.

Sidelink UE-A may directly receive a synchronization signal from another sidelink UE-B.

When sidelink UE-B does not detect an SLSS transmitted from the GNSS, the gNB, the eNB or another sidelink UE as a synchronization source, sidelink UE-B may transmit an SLSS, based on a timing thereof. Sidelink UE-A may directly receive the SLSS transmitted by sidelink UE-B.

In this case, a sidelink synchronization source may be the sidelink UE.

Sidelink UE-A may indirectly receive a synchronization signal from another sidelink UE-B.

Receiving the synchronization signal indirectly from sidelink UE-B may refer to a case in which sidelink UE-A receives an SLSS transmitted by sidelink UE-1 that is directly synchronized with sidelink UE-B. Here, sidelink UE-A may receive the synchronization signal from sidelink UE-B through two hops. In another example, sidelink UE-2 that is synchronized with an SLSS transmitted by sidelink UE-1 that is directly synchronized with sidelink UE-B may transmit an SLSS. Sidelink UE-A receiving the SLSS may receive the synchronization signal from sidelink UE-B through three hops. Similarly, sidelink UE-A may receive a synchronization signal from sidelink UE-B through three or more hops.

In this case, a sidelink synchronization source may be the other sidelink UE synchronized with the sidelink UE.

The sidelink UE may receive a synchronization signal from the foregoing various synchronization sources, and may perform synchronization with a synchronization signal transmitted from a synchronization source having a high priority according to preconfigured priorities.

For example, the following priorities may be preconfigured in order from a synchronization signal having a high priority to a synchronization signal having a low priority.
Case A 1) Synchronization signal transmitted from GNSS>2) Synchronization signal transmitted by UE performing synchronization directly with GNSS>3) Synchronization signal transmitted by UE performing synchronization indirectly with GNSS>4) Synchronization signal transmitted from eNB or gNB (eNB/gNB)>5) Synchronization signal transmitted by UE performing synchronization directly with eNB/gNB>6) Synchronization signal transmitted by UE performing synchronization indirectly with eNB/gNB>7) Synchronization signal transmitted by UE not performing synchronization directly or indirectly with GNSS and eNB/gNB Case A is an example in which a synchronization signal transmitted by the GNSS has a highest priority. Alternatively, a case in which a synchronization signal transmitted by the eNB or gNB (eNB/gNB) has a highest priority may be considered, and the following priorities may be preconfigured.
Case B 1) Synchronization signal transmitted from eNB/gNB>2) Synchronization signal transmitted by UE performing synchronization directly with eNB/gNB>3) Synchronization signal transmitted by UE performing synchronization indirectly with eNB/gNB>4) Synchronization signal transmitted from GNSS>5) Synchronization signal transmitted by UE performing synchronization directly with GNSS>6) Synchronization signal transmitted by UE performing synchronization indirectly with GNSS>7) Synchronization signal transmitted by UE not performing synchronization directly or indirectly with GNSS and eNB/gNB Whether the sidelink UE should follow the priorities of case A or the priorities of case B may be configured by a base station or preconfigured. Specifically, when the sidelink UE is located in coverage of the base station (in-coverage), the base station may configure whether the sidelink UE should follow the priorities of case A or the priorities of case B through system information (SIB) or RRC signaling. When the sidelink UE is located outside the coverage of the base station (out-of-coverage), which of the priorities of case A or the priorities of case B the sidelink UE should follow to perform a sidelink synchronization procedure may be preconfigured.

When the base station configures case A for the sidelink UE through the system information or RRC signaling, the base station may further configure whether the sidelink UE should consider priority 4 (synchronization with the synchronization signal transmitted from the eNB or gNB (eNB/gNB)), priority 5 (synchronization with the synchronization signal transmitted by the UE performing synchronization directly with the eNB/gNB), and priority 6 (synchronization with the synchronization signal transmitted by the UE performing synchronization indirectly with the eNB/gNB) in case A. That is, when case A is configured and priority 4, priority 5, and priority 6 are configured to be additionally considered, all priorities of case A (i.e., from priority 1 to priority 7) may be considered. However, when case A is configured and priority 4, priority 5, and priority 6 are not configured to be considered, or when case A is configured and priority 4, priority 5, and priority 6 are configured not to be considered, priority 4, priority 5, and priority 6 may be omitted from case A (i.e., only priority 1, priority 2, priority 3, and priority 7 are considered).

As used herein, a sidelink synchronization signal may refer a sidelink synchronization signal block (S-SSB), and an S-SSB may include a sidelink primary synchronization signal (S-PSS), a sidelink secondary synchronization signal (S-SSS), and a physical sidelink broadcast channel (PSBCH). An S-PSS may include a Zadoff-Chu sequence or an M-sequence, and an S-SSS may include an M-sequence or a gold sequence. A sidelink ID may be transmitted through a combination of an S-PSS and an S-SSS or only an S-SSS rather than a combination of an S-PSS and an S-SSS as in a PSS/SSS in a cellular system. A PSBCH may transmit a master information block (MIB) for sidelink communication similarly to a physical broadcast channel (PBCH) of the cellular system.

In the disclosure, a case in which a sidelink parameter is preconfigured for the sidelink UE may be mainly applied to a scenario in which the sidelink UE is located outside the coverage of the base station (out-of-coverage scenario). In this case, preconfiguring the parameter for the UE may be interpreted as using a value stored in the UE when the UE is released. In another example, the sidelink parameter may refer to a value stored by the sidelink UE previously obtaining sidelink parameter information through RRC configuration when accessing the base station. In still another example, the sidelink parameter may refer to a value stored by the sidelink UE previously obtaining sidelink system information from the base station although not accessing the base station.

Figure 5:
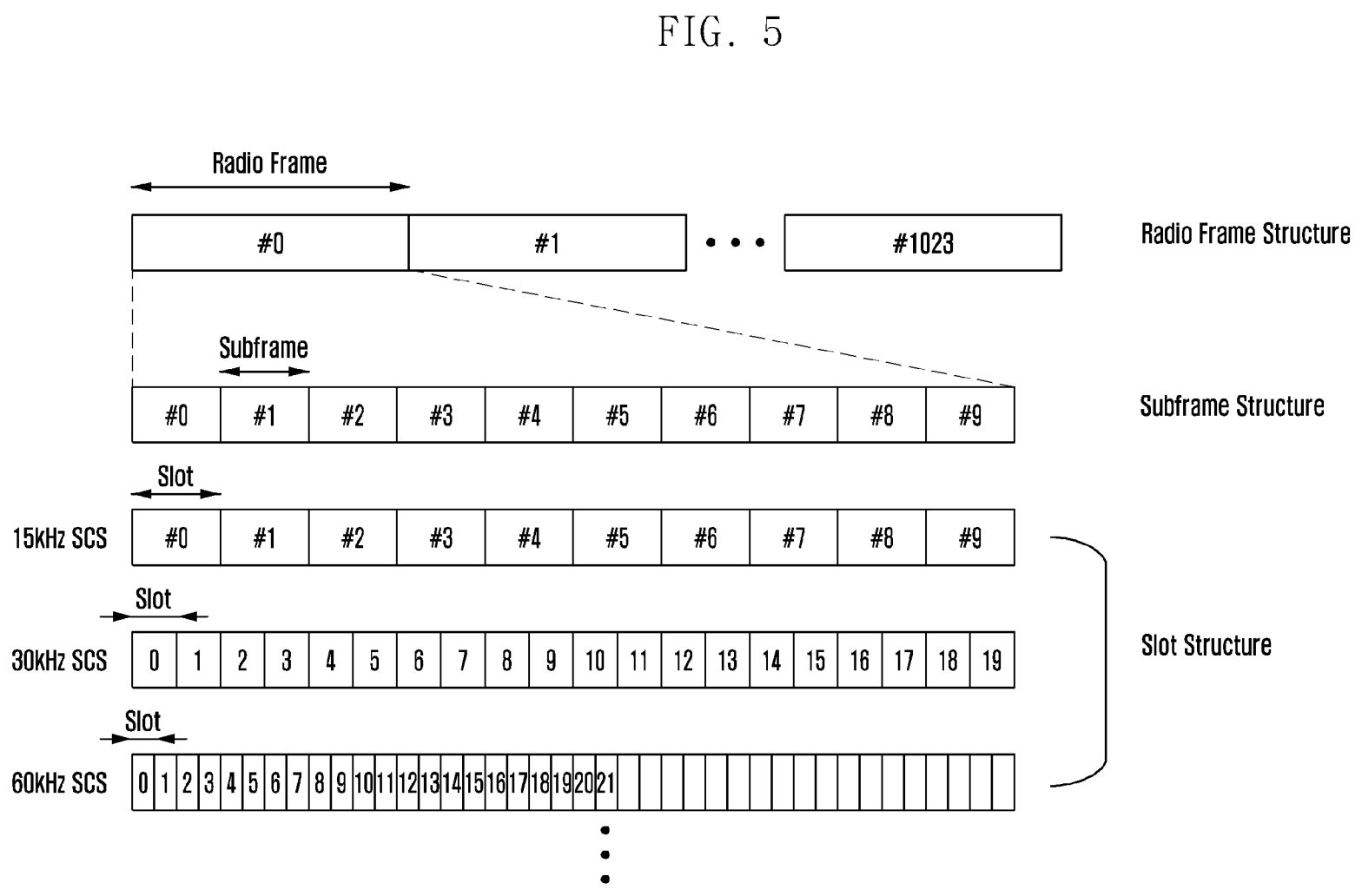

FIG. 5 illustrates a frame structure of a sidelink system according to an embodiment of the disclosure.

Although FIG. 5 shows that the system manages 1024 radio frames, the disclosure is not limited thereto. For example, a specific system may manage less than or more than 1024 radio frames, and the number of radio frames managed by the system may be configured by a base station or preconfigured. Specifically, when a sidelink UE is located in coverage of the base station, the sidelink UE may obtain information about a radio frame through a master information block (MIB) of a PBCH transmitted by the base station. When the sidelink UE is located outside the coverage of the base station, information on a radio frame may be preconfigured for the sidelink UE.

In FIG. 5, a radio frame number and a system frame number may be treated the same. That is, radio frame number 0 may correspond to system frame number 0, and radio frame number 1 may correspond to system frame number 1. One radio frame may include ten subframes, and one subframe may have a length of 1 ms on a time axis. The number of slots forming one subframe may vary according to subcarrier spacing used in NR V2X as shown in FIG. 5. For example, when a subcarrier spacing of 15 kHz is used in NR V2X communication, one subframe may be equal to one slot. However, when a subcarrier spacing of 30 kHz and a subcarrier spacing of 60 kHz are used in NR V2X communication, one subframe may be equal to two slots and four slots, respectively. Although not shown in FIG. 5, the same principle may also be applied when a subcarrier spacing of 120 kHz or more is used. That is, according to generalization of the number of slots forming one subframe, the number of slots forming one subframe may increase to 2n as the subcarrier spacing increases based on a subcarrier spacing of 15 kHz, where n=0, 1, 2, 3, and the like.

Figure 6:
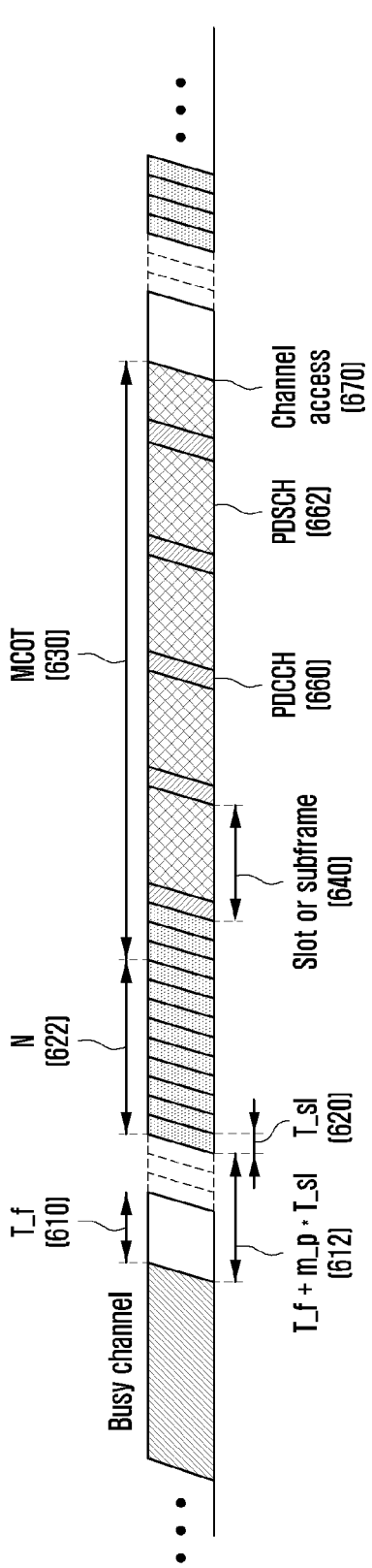
FIG. 6 illustrates an example of a channel access procedure in an unlicensed band in a wireless communication system according to various embodiments of the disclosure.

FIG. 6 illustrates an example of a channel access procedure in an unlicensed band in a wireless communication system according to various embodiments of the disclosure. A situation in which a base station performs a channel access procedure to occupy an unlicensed band is described. According to FIG. 6, the base station to transmit a downlink signal in the unlicensed band may perform a channel access procedure for an unlicensed band for a minimum time of T_f+m_p*T_sl (e.g., defer duration 612 of FIG. 6). T_f is an initial delay duration value, and may be used to identify whether a channel is in an idle state. T_sl is a channel access attempt interval, and m_p is the number of times channel access is possible. When the base station desires to perform the channel access procedure according to channel access priority class 3 (p=3), the size of T_f+m_p*T_sl may be configured using m_p=3 for the size of the defer duration of T_f+m_p*T_sl required to perform the channel access procedure. Here, T_f is a fixed value of 16 μs (e.g., an interval 610 in FIG. 6), in which a channel needs to be in the idle state for an initial time T_sl, and the base station may not perform the channel access procedure for a remaining time (T_f−T_sl) after the time T_sl of a time T_f. Here, even though the base station performs the channel access procedure for the remaining time (T_f−T_sl), channel access may not be achieved. That is, the time T_f−T_sl is a time when the channel access procedure performed by the base station is delayed.

When the unlicensed band is in the idle state for an entire time of m_p*T_sl, N may be N−1. Here, N may be selected as a random integer value among values from 0 to a contention window value (CW_p) at a time when the channel access procedure is performed. In channel access priority class 3, a minimum contention window value and a maximum contention window value are 15 and 63, respectively. When the unlicensed band is determined to be idle in the defer duration and an additional interval in which the channel access procedure is performed, the base station may transmit a signal through the unlicensed band for a time T_mcot,p (8 ms). In the disclosure, embodiments are described based on downlink channel access priority classes for convenience of explanation. In an uplink, the same channel access priority classes as illustrated in Table 1 may be used, or separate channel access priority classes for uplink signal transmission may be used.

TABLE 1

| Channel Access Priority Class (p) | $m_p$ | $CW_{min,p}$ | $CW_{max,p}$ | $T_{mcot,p}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |

TABLE 1-continued

| Channel Access Priority Class (p) | $m_p$ | $CW_{min,p}$ | $CW_{max,p}$ | $T_{mcot,p}$ | Allowed $CW_p$ sizes |
|---|---|---|---|---|---|
| 3 | 3 | 15 | 63 | 8 or 10 ms | {15, 31, 63} |
| 4 | 7 | 15 | 1023 | 8 or 10 ms | {15, 31, 63, 127, 255, 511, 1023 } |

The initial contention window value (CW_p) is a minimum contention window value (CW_min,p). Upon selecting the value of N, the base station may perform the channel access procedure in a T_sl interval (e.g., a slot interval 620 in FIG. 6), may change N to N−1 when the unlicensed band is determined to be idle through the channel access procedure performed in the T_sl interval, and may transmit a signal through the unlicensed band for a maximum time of T_mcot,p (e.g., a maximum occupancy time 630 in FIG. 6) when N=0. When the unlicensed band determined through the channel access procedure for the time T_sl is not in the idle state, the base station may perform the channel access procedure again without changing the value of N.

The size of the contention window value (CW_p) may be changed or maintained according to the ratio (Z) of negative acknowledgements (NACKs) among reception results (ACK/NACK) with respect to downlink data transmitted or reported to the base station by one or more UEs having received downlink data transmitted through a downlink data channel in a reference subframe, a reference slot, or a reference TTI, that is, downlink data received in the reference subframe, the reference slot, or the reference TTI. Here, the reference subframe, the reference slot, or the reference TTI may be determined based on one of a time at which the base station initiates the channel access procedure, a time at which the base station selects the value of N to perform the channel access procedure, a first subframe, slot, or transmission time interval (TTI) of a downlink signal transmission interval (or a maximum channel occupancy time (MCOT)) in which the base station has most recently transmitted a downlink signal through the unlicensed band just before the foregoing two times, or a starting subframe, a starting slot, or a starting transmission interval of the transmission interval.

Referring to FIG. 6, the base station may attempt channel access to occupy the unlicensed band. Times 602 and 670 at which a channel access procedure is initiated, a time at which the base station selects the value of N 622 to perform the channel access procedure, or a first slot (starting slot starting a channel occupancy interval), subframe, or transmission interval 640 of a downlink signal transmission interval (or channel occupancy time, hereinafter interchangeable with MCOT) in which the base station has most recently transmitted a downlink signal through the unlicensed band just before the times may be defined as a reference slot, a reference subframe, or a reference transmission interval. For convenience of explanation, the term "reference slot" is used hereinafter. Specifically, one slot or one more consecutive slots including a first slot in which a signal is transmitted among all slots of the downlink signal transmission interval 630 may be defined as the reference slot. Further, according to an embodiment, when the downlink signal transmission interval starts after a first symbol of the slot, a slot in which downlink signal transmission starts and a slot subsequent to the slot may be defined as the reference slot. When the ratio of NACKs among reception results with respect to downlink data transmitted or reported to the base station by one or more UEs having received downlink data transmitted through a downlink data channel in the reference slot is Z or greater, the base station may determine the value or size of a contention window used for the channel access procedure 670 of the base station to be a next greater contention window than a contention window used in the previous channel access procedure 602. That is, the base station may increase the size of the contention window used in the channel access procedure 602. The base station may perform the next channel access procedure 670 by selecting the value of N 622 from a range defined according to the contention window with the increased size.

When the base station fails to obtain a reception result with respect to a downlink data channel transmitted in the reference slot of the transmission interval 630, for example, when a time interval between the reference slot and the time 670 at which the base station initiates the channel access procedure is n slots or symbols or less (i.e., when the base station initiates the channel access procedure before a minimum time in which the UE is able to report the reception result with respect to the downlink data channel transmitted in the reference slot to the base station), a first slot of a downlink signal transmission interval in which a downlink signal has been most recently transmitted before the downlink signal transmission interval 630 may be the reference slot may be the reference slot.

In other words, when failing to receive, from the UE, the reception result with respect to the downlink data transmitted at the time 670 when the base station initiates the channel access procedure, at the time when the base station selects the value of N to perform the channel access procedure, or in the reference slot 640 just before the times, the base station may determine a contention window by using a downlink data reception result of the UE with respect to the reference slot in the transmission interval in which the downlink signal has been most recently transmitted among reception results with respect to downlink data channels previously received from the UEs. The base station may determine the size of the contention window used in the channel access procedure 670 by using the downlink data reception results received from the UEs with respect to downlink data transmitted through a downlink data channel in the reference slot.

For example, the base station having transmitted a downlink signal through a channel access procedure (e.g., CW_p=15) configured according to channel access priority class 3 (p=3) may increase the contention window from the initial value (CW_p=15) to the next contention window value (CW_p=31) when 80% or more of reception results of the UE with respect to downlink data transmitted to the UE through a downlink data channel in the reference slot among downlink signals transmitted through the unlicensed band are determined as NACKs. A percentage of 80% is an illustrative value, and may be variously changed.

When 80% or more of the reception results of the UE are not determined as NACKs, the base station may maintain the value of the contention window as an existing value, or may change the value of the contention window to the initial contention window value. A change of the contention window may be commonly applied to all channel access priority classes, or may be applied only to a channel access priority class used for a specific channel access procedure. Here, a method for determining the value of Z that determines the change of the size of the contention window among reception results with respect to the downlink data that the UE transmits or reports to the base station with respect to the downlink data transmitted through the downlink data channel in the reference slot for determining the change of the size of the contention window is as follow.

When the base station transmits one or more codewords (CWs) or TBs to one or more UEs in a reference slot, the base station may determine the value of Z with the ratio of NACKs among reception results transmitted or reported by the UE with respect to the TBs received by the UE in the reference slot. For example, when two codewords or two TBs are transmitted to one UE in the reference slot, the base station may receive reception results of a downlink data signal with respect to the two TBs or receive a report on the reception results from the UE. When the ratio (Z) of NACKs among the two reception results is equal to or greater than a threshold value (e.g., Z=80%) defined in advance or configured between the base station and the UE, the base station may change or increase the size of the contention window.

When a UE transmits or reports reception results of downlink data for one or more slots (e.g., M slots) including a reference slot to the base station via bundling, the base station may determine that the UE transmits M reception results. The base station may determine the value of Z with the ratio of NACKs among the M reception results, and may change, maintain, or initialize the size of the contention window.

When a reference slot is a second slot of two slots included in one subframe, or when a downlink signal is transmitted through from a symbol after a first symbol in the reference slot, the reference slot and a subsequent slot may be determined as a reference slot, and the value of Z may be determined as the ratio of NACKs among reception results transmitted or reported by the UE to the base station with respect to downlink data received in the reference slot.

In a case where scheduling information or downlink control information about a downlink data channel transmitted by the base station are transmitted in the same cell or frequency band as a cell or frequency band in which the downlink data channel is transmitted or in a case where the scheduling information or downlink control information about the downlink data channel transmitted by the base station are transmitted through the unlicensed band but are transmitted in a different cell or frequency band from the cell or frequency band in which the downlink data channel is transmitted, when it is determined that a UE does not transmit a reception result with respect to downlink data received in a reference slot or when a reception result with respect to downlink data transmitted by the UE is determined as at least one of discontinuous transmission (DTX), NACK/DTX, or any state, the base station may determine the reception result from the UE as NACK, and may determine the value of Z.

In a case where scheduling information or downlink control information about a downlink data channel transmitted by the base station are transmitted through a licensed band, when reception result with respect to downlink data transmitted by the UE is determined as at least one of DTX, NACK/DTX, or any state, the base station may not reflect the reception result from the UE in a reference value Z for a contention window change. In other words, the base station may ignore the reception result from the UE, and may determine the value of Z.

In a case where the base station transmits scheduling information or downlink control information about a downlink data channel through the licensed band, when the UE transmits or reports reception results of downlink data for a reference slot to the base station but the base station has not actually transmitted the downlink (no transmission), the base station may ignore the reception results transmitted or reported by the UE with respect to the downlink data, and may determine the value of Z.

In 5G NR, applications may be possible considering reference duration instead of a reference slot. The reference duration may be considered from a time when a COT starts to a last time of a first slot transmitted and received without puncturing in a resource in which at least one unicast PDSCH is scheduled. Alternatively, the reference duration may be considered from the time when the COT starts to a last time of a first transmission burst included without puncturing in the resource in which the at least one unicast PDSCH is scheduled. In a TB-unit transmission method, when an HARQ-ACK value for at least one unicast PDSCH in the reference duration is ACK, a UE may determine the size of a contention window as a minimum value, and otherwise, the UE may increase the size of the contention window by 1. In a CBG-unit transmission method, when the ratio of HARQ-ACK information values for PDSCHs in the reference duration is at least 10%, the UE may determine the size of the contention window as the minimum value, and otherwise, the UE may increase the size of the contention window by 1.

In a downlink, contention window size adjustment of the base station may be determined using CBG-based HARQ-ACK information, non-unicast data information, data transmission in a non-slot unit, or a no-transmission event in which data is scheduled but not actually transmitted. For example, when CBG-based HARQ-ACK information transmission is configured, the value of Z may be determined by ACK or NACK information separately considering pieces of HARQ-ACK information by each CBG. In a case of non-unicast data information, since there is no transmission of HARQ-ACK information, ACK or NACK information thereabout may be always determined as ACK, NACK or none of ACK and NACK when determining the ACK or NACK information. Not determining the ACK/NACK information means that feedback information about unicast data information is not available and thus is not considered to determine the value of Z.

In an uplink, contention window size adjustment of the UE is similar to the contention window size adjustment of the base station in the downlink, but may be implicitly determined considering a unicast PUSCH instead of a unicast PDSCH in determining reference duration, and using HARQ-ACK information explicitly indicated through the base station as HARQ-ACK information or a new data indicator (NDI) including DCI scheduling a PUSCH. For example, a one-bit NDI value is toggled to a value different from a previous value for a specific HARQ process number, the UE may determine that transmission of a previously transmitted PUSCH has succeeded (ACK), and when the one-bit NDI value is not toggled, the UE may determine that the transmission of the previously transmitted PUSCH has failed (NACK). The NDI value being toggled means that the NDI value is changed from 1 to 0 or from 0 to 1, and The NDI value not being toggled means that the NDI value is maintained from 1 to 1 or from 0 to 0.

When HARQ-ACK information about a previously transmitted PUSCH within the determined reference duration is available, the UE determines a contention window size as a minimum size in a case of ACK, and increases the contention window size by 1 in a case of NACK. The HARQ-ACK information about the previously transmitted PUSCH within the determined reference duration may not always be available. Therefore, in this case, the UE applies a contention window size that is the same as a contention window size used immediately before when transmission of the PUSCH is initial transmission or transmission of the PUSCH during the reference duration, and increases the contention window size by 1 when the transmission of the PUSCH is retransmission.

A channel access procedure in the unlicensed band may be classified according to whether a channel access procedure start time of a communication device is fixed (frame-based equipment: FBE) or variable (load-based equipment: LBE). The communication device may be determined as an FBE device or an LBE device depending on whether a transmit/receive structure of the communication device has one period or no period in addition to the channel access procedure start time. The channel access procedure start time being fixed may mean that a channel access procedure of the communication device may be periodically initiated according to a predefined period or a period declared or configured by the communication device. In another example, the channel access procedure start time being fixed may mean that the transmit or receive structure of the communication device has one period. The channel access procedure start time being variable may mean that the channel access procedure start time of the communication device may be any time when the communication device desires to transmit a signal through the unlicensed band. In another example, the channel access procedure start time being variable may mean that the transmit or receive structure of the communication device may be determined as needed instead of having a single period.

The channel access procedures in the unlicensed band may include a procedure of determining an idle state of the unlicensed band by the communication device measuring the strength of a signal received through the unlicensed band for a fixed time or a time calculated according to a predefined rule (e.g., a time calculated through one random value selected at least by a base station or a UE) and comparing the strength of the signal with a predefined threshold value or a threshold value calculated by a function determining the level of received signal strength according to at least one variable among a channel bandwidth, a signal bandwidth in which a signal to be transmitted is transmitted, and/or the strength of transmission power.

For example, the communication device may measure the strength of a signal received for X µs (e.g., 25 µs) immediately before a time when a signal is to be transmitted, may determine that the unlicensed band is in idle when the measured strength of the signal is less than a predefined or calculated threshold value T (e.g., −72 dBm), and may transmit the configured signal. Here, a maximum time for continuous signal transmission after a channel access procedure may be limited according to a maximum channel occupancy time (MCOT) defined for each country, region, and frequency band in each unlicensed band. The maximum time may also be limited according to the type of the communication device (e.g., a base station, a UE, or a master device, or a slave device). For example, in Japan, in a 5-GHz unlicensed band, a base station or a UE may occupy a channel to transmit a signal for up to 4 ms without performing an additional channel access procedure in the unlicensed band determined to be idle after performing a channel access procedure.

More specifically, when a base station or a UE desires to transmit a downlink or uplink signal in an unlicensed band, channel access procedures that the base station or UE may perform may be classified into at least the following types.

Type 1: Transmission of uplink/downlink signals after performing a channel access procedure for a variable time Type 2: Transmission of uplink/downlink signals after performing a channel access procedures for a fixed time Type 3: Transmission of a downlink or uplink signal without performing a channel access procedure A transmission device (e.g., a base station or a UE) to perform signal transmission in an unlicensed band may determine a method (or type) of a channel access procedure according to the type of a signal to be transmitted. In the 3GPP, LBT procedures, which are a channel access methods, may be largely classified into four categories. The four categories may include a first category, which is a method in which LBT is not performed, a second category, which is a method in which LBT is performed without a random backoff, a third category, which is a method in which LBT is performed through a random backoff in a fixed-size contention window, and a fourth category, which is a method in which LBT is performed through a random backoff in a variable-sized contention window. According to an embodiment, the third category and the fourth category may be illustrated in type 1, the second category may be illustrated in type 2, and the first category may be illustrated in type 3. Type 2 or the second category in which a channel access procedure is performed for a fixed time may be classified into one or more types according to the fixed time for which the channel access procedure is performed. For example, type 2 may be classified into a type in which a channel access procedure is performed for a fixed time of A μs (e.g., 25 μs) (type 2-1) and a type in which a channel access procedure is performed for a fixed time of B μs (e.g., 16 μs) (type 2-2).

The foregoing description has been made mainly for a downlink in which a base station transmits a signal to a UE or an uplink in which a UE transmits a signal to a base station, but may be sufficiently applied to a sidelink in which a UE transmits a signal to another UE.

Hereinafter, in the disclosure, for convenience of explanation, a transmission device is assumed as a base station or a UE, and a transmission device and a base station may be interchangeably used. In addition, a sidelink may be assumed instead of a downlink, in which case a UE may be applied in replacement of a base station.

For example, when a base station desires to transmit a downlink signal including a downlink data channel in an unlicensed band, the base station may perform a channel access procedure of type 1. Further, when the base station desires to transmit a downlink signal that does not include a downlink data channel, for example, to transmit a synchronization signal or a downlink control channel, in the unlicensed band, the base station may perform a channel access procedure of type 2, and may transmit the downlink signal.

Here, the type of a channel access procedure may be determined according to the transmission length of a signal to be transmitted in the unlicensed band or the length of a time or period for which the unlicensed band is occupied and used. In general, the channel access procedure of type 1 may be performed for a longer time than the channel access procedure performed of type 2. Therefore, when a communication device desires to transmit a signal for a short time period or a time of a reference time (e.g., X ms or Y symbols) or less, the channel access procedure of type 2 may be performed. However, when the communication device desires to transmit a signal for a longer time period or a time that exceeds or is equal to or greater than the reference time (e.g., X ms or Y symbols), the channel access procedure of type 1 may be performed. In other words, different types of channel access procedures may be performed according to the usage time of the unlicensed band.

When the transmission device performs the channel access procedure of type 1 according to at least one of the foregoing criteria, the transmission device that desires to transmit a signal in the unlicensed band may determine a channel access priority class (or channel access priority) according to a quality of service class identifier (QCI) of the signal to be transmitted in the unlicensed band, and may perform the channel access procedure by using at least one value among configuration values predefined for the determined channel access priority class as in Table 1. Table 1 shows a mapping relationship between channel access priority classes and QCIs. The mapping relationship between channel access priority classes and QCIs shown in Table is only an example, and the disclosure is not limited thereto.

For example, QCIs 1, 2, and 4 refer to OCI values for services, such as conversational voice, conversational video (live streaming), and non-conversational video (buffered streaming), respectively.

Alternatively, the type of a channel access procedure to be performed may vary depending on whether the transmission device supports LBE or FBE. For example, a transmission device supporting LBE may perform at least one channel access method among type 1 to type 3, while a transmission device supporting FBE may perform only the channel access method of type 2.

Alternatively, the transmission device may apply different types of channel access methods according to a specific situation. For example, the transmission device may use the channel access method of type 1 to start channel occupation (MCOT). In another example, after the transmission device occupies a channel, when different transmission bursts exist within a channel-occupied period and a gap between the bursts is X μs (e.g., 16 μs) or greater, the transmission device may use the channel access method of type 2. In still another example, after the transmission device occupies a channel, when a gap between different transmission bursts within a channel-occupied period is X μs (e.g., 16 μs) or less and the total length of a second burst is Y μs (e.g., 584 μs) or less, the transmission device may use a channel access method of type 3. A transmission burst may be at least one of synchronization/control/data channels of a downlink, an uplink, or a sidelink or a combination thereof. The transmission burst may refer to a bundle of channels in which transmission channels are consecutively contiguous in terms of time resources.

In the following description, a communication device and a UE are used as the same concept, and may be interchangeably used. A transmission end refers to a communication device that transmits data, and a reception end refers to a communication device that receives data. Further, the transmission end may refer to a communication device that occupies a channel for data transmission, and the reception end may refer to a communication device that transmits HARQ-ACK feedback to a transmission end when transmitting the feedback upon data reception.

Figure 7:
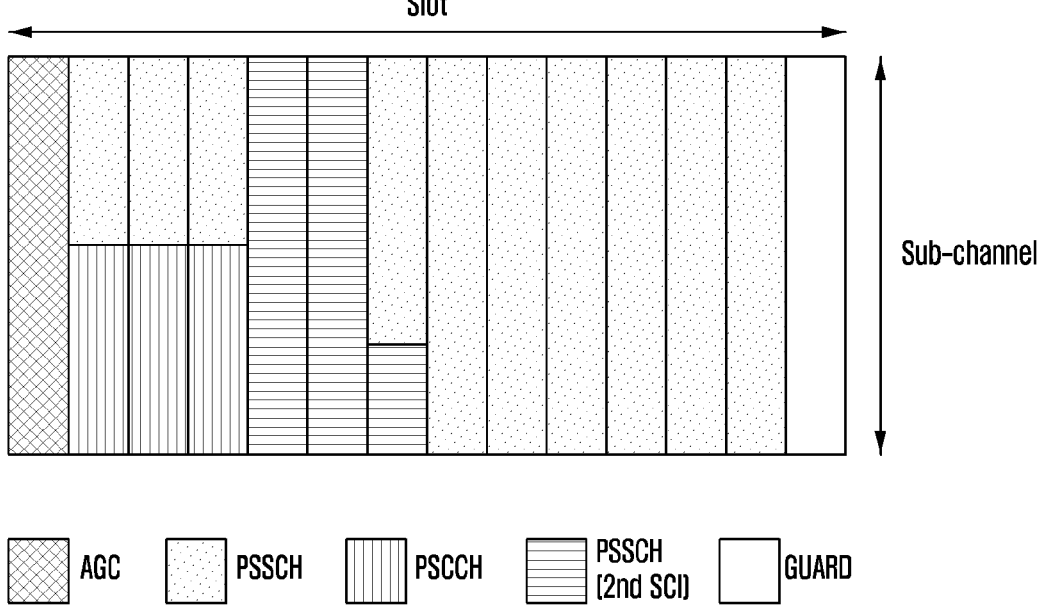
FIG. 7 illustrates a structure of a sidelink channel according to an embodiment of the disclosure.

FIG. 7 illustrates a structure of a sidelink channel according to an embodiment of the disclosure.

For sidelink data transmission and reception, as illustrated in FIG. 7, the sidelink channel may include one adaptive gain controller (AGC) symbol, three physical sidelink control channels (PSCCHs), 12 physical sidelink shared channels (PSSCHs), and one GUARD symbol.

The number of symbols for each physical channel in FIG. 7 is only an example, and different numbers of symbols may be configured for the respective channels. A PSSCH may include not only data information but also second control information (sidelink control information: SCI) indicated by first control information (first SCI) included in a PSCCH, and the PSSCH may be configured alone without second SCI as illustrated in FIG. 7. A first symbol is the AGC symbol, and may include the same information as that of a second symbol. The reason why the AGC symbol is used is one of main characteristics of sidelink communication: a plurality of transmission ends to perform transmission may exist, may be at different distances from a reception end, and may have different transmission powers. Accordingly, for the reception end, a difference in received power strength may occur depending on which transmission end performs sidelink communication. The reception end needs time to correct the difference, and thus the first symbol is allocated as the AGC symbol as illustrated in FIG. 7. The PSCCH is a physical channel carrying sidelink control information (SCI), and may have at least one value among 10, 12, 15, 20, and 25 PRBs in one subchannel, and this value may be configured by an higher signal. Although the number of symbols of the PSCCH is three symbols in FIG. 7, one symbol or two symbols are also possible, and this value may be configured by an higher signal. The control information included in the PSCCHs is mapped from the lowest PRB index.

The PSSCH is a physical channel carrying sidelink data information (transport block: TB), and the second SCI may be mapped from a first DMRS symbol transmitted on the PSSCHs. The PSSCH may be transmitted by a unit of one subchannel, one subchannel may have a size of at least one value among 10, 12, 15, 20, 25, 50, 75, and 100 PRBs, and one to 27 subchannels may exist in one SL BWP. When the PSSCH and the PSCCH have the same PRB, all of second, third, and fourth symbols in FIG. 7 may be symbols including the PSCCH. Although not separately shown in FIG. 7, a reference signal (demodulation reference signal: DMRS) for decoding the PSSCH may be included in a fifth symbol. In addition, although not separately shown in FIG. 7, a physical sidelink feedback channel (PSFCH) carrying HARQ-ACK information about the PSSCH may exist instead of the PSSCH in 12th and 13th symbols. When the PSFCH exists, a 10th symbol may be a GUARD symbol. A purpose of introducing the GUARD symbol is that a UE receiving the PSSCHs uses a switch (switching) time to transmit the PSFCH, and thus one symbol is added. A 14th symbol is the GUARD symbol for a similar reason, because, referring to FIG. 7, for example, a time for a switch between transmission and reception is needed in at least one of a case where a UE transmitting a PSCCH/PSSCH in slot n receives a PSCCH/PSSCH from a different UE in slot n+1 or a case where a UE receiving a PSCCH/PSSCH in slot n transmits a PSCCH/PSSCH to a different UE in slot n+1. A transport format transmitted by the UE in the PSFCH is the same as PUCCH Format 0 defined in the 3GPP Rel-15 NR standard, and is configured in a form of repeated transmission over one PRB and two symbols based on a Zadoff-Chu sequence. As described above, a first symbol of the two symbols of the PFSCH may be used for AGC.

In the above description, the first control information provides information related to resource allocation, and may include, for example, at least one of frequency resource information, time resource information, a DMRS pattern, a second control information format, the size of a resource allocated to the second control information, a DMRS port count, an MCS, and whether a PSFCH is transmitted. Among the above examples, the DMRS pattern is a field indicating information about time and frequency resources allocated to a DMRS for PSSCH reception, and the second control information format is a field indicating size and configuration information about the second control information transmitted in the PSSCHs, the size of the resource allocated to the second control information is a field indicating the amount of resources allocated to the second control information in the PSSCHs, the DMRS port count is a field indicating information about the number of ports in which a DMRS is transmitted, and the MCS is a an abbreviation of modulation and coding scheme, and is a field indicating information in which the PSSCHs are encoded. The second control information provides specific information that is specific to a UE or related to a corresponding service, and may include, for example, at least one of a HARQ process number, a new data indicator (NDI), a redundancy version (RV), a source ID, a destination ID, a HARQ feedback enabled/disabled indicator, a cast type indicator, and a CSI request field. Among the above examples, the NDI includes one bit, and is a field indicating whether current transmission of the TB of the PSSCH is retransmission or initial transmission, which is determined as initial (new) transmission when toggled (changed from 1 to 0 or from 0 to 1), and is determined as retransmission when not toggled, the RV is a field indicating a starting point of a coded bit when the PSSCH is coded based on low-density parity-check (LDPC) coding, the source ID is a field indicating an ID of a UE transmitting the PSSCH, the destination ID is a field indicating an ID of a UE receiving the PSSCH, and the HARQ feedback enabled/disabled indicator is an indicator field indicating whether HARQ feedback on the transmission of the PSSCH is transmitted, the cast type indicator is a field indicating whether the currently transmitted PSSCH is unicast, groupcast, or broadcast, and the CSI request is a field including an indication of a reception UE instructing a transmission UE to transmit measured CSI. A time resource for sidelink communication may be configured as one value among 7 to 14 symbols within one slot including 14 symbols for each SL bandwidth part (BWP).

In FIG. 7, a structure for transmitting and receiving a control/data channel for sidelink communication has been described. Although this structure may be applied to an unlicensed band, specific conditions need to be observed due to different regulations and restrictions in each country or continent. One of the regulations is an occupied channel bandwidth (OCB), which is defined such that a frequency bandwidth including 99% of transmission signal power needs to be included within 80% to 100% of a nominal channel bandwidth in which corresponding transmission signal is performed. For example, a UE may need to unconditionally perform transmission of at least 14 MHz or greater in an unlicensed band having a channel frequency bandwidth of 20 MHz to satisfy the above regulation. For reference, 80% is only an illustrative value, and may change in each country. However, when the UE uses a wide bandwidth, transmission power efficiency is reduced to reduce a transmission distance, resulting in a decrease in communication radius in the unlicensed band. Therefore, in a bandwidth to which a signal including 80% to 100% of the channel frequency bandwidth is allocated needs not be necessarily allocated, when at least one PRB for specific M PRBs is allocated without consecutive allocation, the above regulation may be satisfied. A method of allocating control or data information at regular intervals in terms of frequency instead of consecutively allocating the information is referred to as an interlace resource allocation method. For example, an interlace block m may have a value of 0 to M−1, where m may be considered such that a resource is actually allocated as a common resource block {m, M+m, 2M+m, 3M+m, . . . }, and M may have a different value depending on subcarrier spacing. The interlace method may not need to be satisfied in all countries and continents where the unlicensed band is used, and may be used only in countries and continents where the regulation needs to be satisfied, and the foregoing configuration may be configured by an higher signal. However, because sidelink communication, is used to support communication in an out-of-coverage area without separate base station configuration, sidelink communication may be supported considering GPS information, predetermined location information, or the interlace structure from a time of manufacturing the UE within an area where the regulation is required. Determining whether the OCB regulation is satisfied with the structure of the sidelink channel illustrated in FIG. 7, in a PSCCH/PSSCH, for example, including 20 PRBs in FIG. 7, it is difficult to transmit a control/data channel in a system with a channel frequency bandwidth including 100 PRBs. Since the 100 PRBs are the number of PRBs possible in a 20 MHz band with a subcarrier spacing of 15 kHz, it is difficult to freely utilize the structure of FIG. 7 in the above environment. Since it is possible to configure the PSCCH/PSSCH including the 100 PRBs in FIG. 7, it is possible to transmit a control/data channel while satisfying the OCB requirement in a limited manner. However, since FDM with a different UE is not allowed, only one UE is allowed to perform data transmission and reception one at a specific moment.

There may be a plurality of methods for improving communication reliability in sidelink communication. Examples are repeated transmission, transmission with a low code rate, or determination of success or failure of data at a reception end through a feedback channel. A most efficient method for increasing reliability may be introducing a feedback channel. Repeated transmission and transmission with a low code rate may increase reliability, but are likely to consume an unnecessarily large amount of sidelink radio resources. Therefore, a sidelink UE operating in a licensed band may receive feedback information on transmitted data information, and may determine whether to transmit other data or retransmit the previously transmitted data accordingly.

Figure 8:
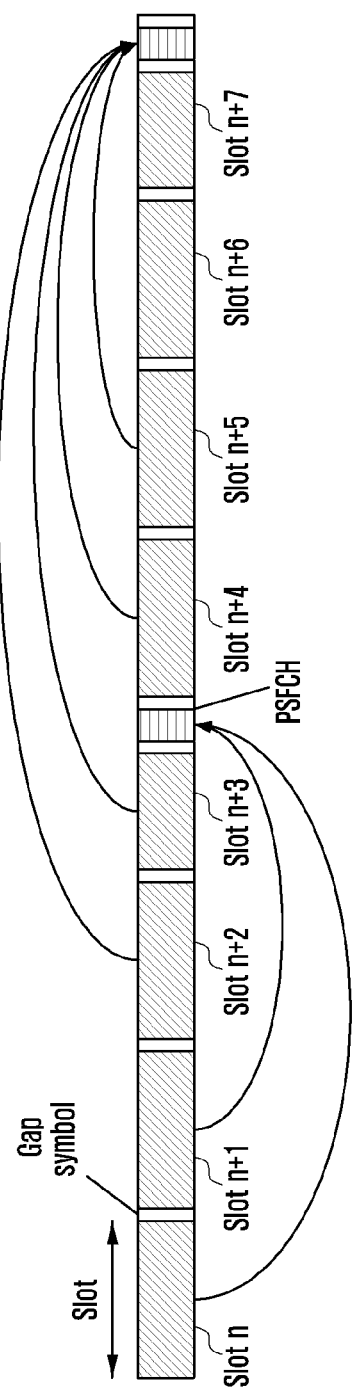
FIG. 8 illustrates a relationship between a control/data channel and a feedback channel of a sidelink UE operating in a licensed band.

FIG. 8 illustrates a relationship between a control/data channel and a feedback channel of a sidelink UE operating in a licensed band.

Although a PSFCH is assumed to exist in slot n+3 and slot n+7 considering that the PSFCH exists every four slots, the PSFCH may exist every two slots or on slot. Further, although the PSFCH is assumed to be regularly allocated in FIG. 8, the PSFCH may be irregularly allocated. A slot in which a PSCCH/PSSCH is transmitted and received may be mapped to a slot in which a PSFCH including HARQ feedback information. For example, in FIG. 8, when sidelink UE-A transmits a PSCCH/PSSCH in slot n and slot n+1, sidelink UE-1 receiving the PSCCH/PSSCH transmits HARQ feedback on the PSCCH/PSSCH in a PSFCH existing in slot n+3. Here, HARQ information about the PSCCH/PSSCH transmitted and received in each slot is transmitted and received in the PSFCH of slot n+3, but channels including respective pieces of HARQ feedback information may be distinguished with different frequencies, different times (symbols), or different code resources to be transmitted and received via the PSFCH. When sidelink UE-A transmits a PSCCH/PSSCH in slot n+2 and slot n+3, sidelink UE-1 receiving the PSCCH/PSSCH transmits HARQ feedback on the PSCCH/PSSCH in slot n+7 instead of slot n+3, because sidelink UE-1 uses a processing time to demodulate and decode the PSCCH/PSSCH transmitted by sidelink UE-A in slot n+2 and slot n+3 and a processing time to generate HARQ feedback information about the PSCCH/PSSCH. Accordingly, sidelink UE-1 has difficulty in transmitting a PSFCH in slot n+3, and thus transmits the PSFCH in slot n+7. Therefore, slots in which the PSCCH/PSSCH with respect to the PSFCH transmitted in slot n+7 is transmitted and received are slot n+2, slot n+3, slot n+4, and slot n+5. Although not show in FIG. 8, a PFSCH including HARQ feedback information about a PSCCH/PSSCH transmitted and received in slot n+6 and slot n+7 is transmitted and received in slot n+11. Assuming that a slot period in which a PSFCH exists is m and a PSCCH/PSSCH needs to be transmitted and received before at least k slots to include HARQ feedback information in the PSFCH, m=4 and k=2 in FIG. 8. FIG. 8 is only for illustration, and values other than m=4 and k=2 may be applied. A PSCCH/PSSCH structure illustrated in FIG. 8 may adopt the structure illustrated in FIG. 7. In FIG. 8, a gap symbol needs to exist before sidelink UEs transmit a PSCCH/PSSCH or transmit a PSFCH. The gap symbol generally has a size of one symbol, and is a period existing to provide a processing time used for a switch of a sidelink UE from a reception mode to a transmission mode. When one sidelink UE transmits a PSCCH/PSSCH or receives a PSCCH/PSSCH in both slot n and slot n+1, a separate processing time for the switch may not be needed. However, since a characteristic of sidelink communication makes it difficult to predict when sidelink UE transmits or receives data or which sidelink UE transmits or receives data, the gap symbol illustrated in FIG. 8 is considered a processing time used for the switch. When the structure illustrated in FIG. 8 is applied to an unlicensed band, sidelink UE-A to continuously transmit sidelink data in slot n and slot n+1, has a possibility of performing additional channel access because of the gap symbol between slot n and slot n+1. Since one symbol has a length of approximately 71 μs based on a 15-kHz subcarrier and a gap between consecutive transmission intervals is 25 μs or greater in the unlicensed band and thus channel access of type 1 (channel access for a variable period) needs to be performed, there is a possibility that a PSCCH/PSSCH is not transmitted in slot n+1. In addition, since one symbol has a length of approximately 36 μs based on a 30-kHz subcarrier and a gap between consecutive transmission intervals is 25 μs or greater in the unlicensed band and thus channel access of type 1 (channel access for a variable period) needs to be performed, there is a possibility that a PSCCH/PSSCH is not transmitted in slot n+1. Further, since one symbol has a length of approximately 18 μs based on a 60-kHz subcarrier and a gap between consecutive transmission intervals is 25 μs or greater in the unlicensed band and thus channel access of type 2 (channel access for a fixed period) or channel access of type 3 (no channel access) needs to be performed, there is a high possibility that a PSCCH/PSSCH is transmitted in slot n+1. For reference, a criterion for determining channel access of type 2 (channel access for the fixed period) or channel access of type 3 (no channel access) may be determined by the transmission length of a PSCCH/PSSCH transmitted in slot n+1 (and a subsequent slot). For example, when the transmission length is 584 μs or greater, channel access of type 2 (channel access for the fixed period) may be performed, and when the transmission length is 584 μs or less, channel access of type 3 (no channel access) may be performed. A value of 584 μs is only for illustration, and may be replaced with a different value. The value may be configured by a base station or may be preconfigured. Further, the value may be configured to different values respectively in the licensed band and the unlicensed band. In subcarriers of 15 kHz and 30 kHz smaller than a subcarrier of 60 kHz, various methods may be used to solve a problem caused by the gap of one symbol illustrated in FIG. 8.

Figure 9:
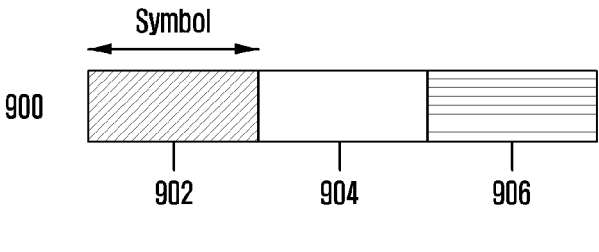
FIG. 9 illustrates a method of configuring a gap period within 25 μs in an unlicensed band according to an embodiment of the disclosure.
Figure 9:
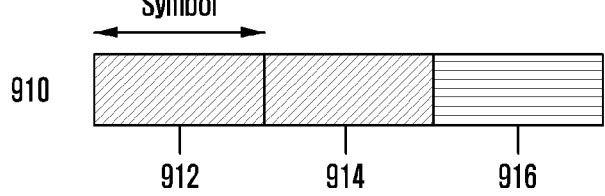
Figure 9:
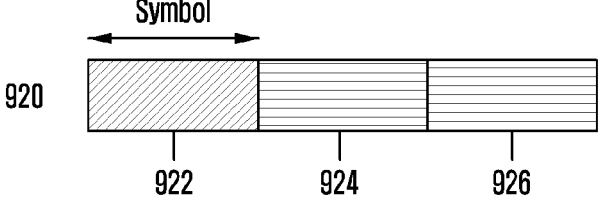
Figure 9:
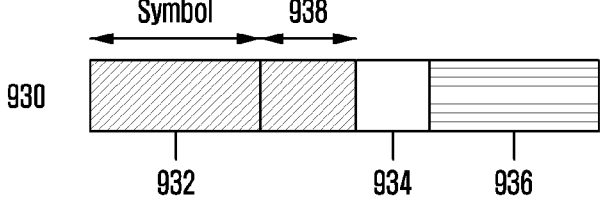
Figure 9:
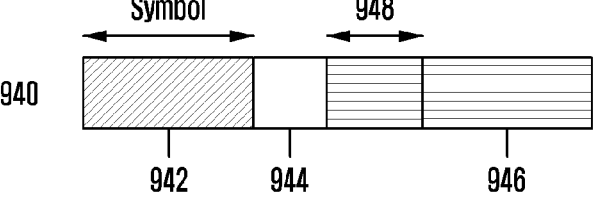
Figure 9:
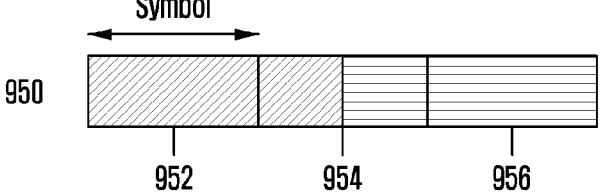

FIG. 9 illustrates a method of configuring a gap period within 25 μs in an unlicensed band according to an embodiment of the disclosure.

902, 912, 922, 932, 942, and 952 are first sidelink channels, which may be at least one of a PSCCH, a PSSCH, or a PSFCH, and are shown with a length of one symbol in FIG. 9 but may be shown as only a last symbol of a form including two or more symbols in FIGS. 9. 906, 916, 926, 936, 946, and 956 are second sidelink channels, which may be at least one of a PSCCH, a PSSCH, or a PSFCH, and are shown with a length of one symbol in FIG. 9 but may be shown as only a first symbol of a form including two or more symbols in FIG. 9. The symbols illustrated in 900, 910, 920, 930, 940, and 950 may exist in the same slot or subframe, or at least some of the symbols may exist in different slots or subframes.

Hereinafter, methods for supporting the channel access method of type 2 or the channel access method of type 3 between a first sidelink channel and a second sidelink channel will be described. A sidelink UE operating in the unlicensed band may employ at least one of the following methods, or may employ a combination thereof.

Method 1-1 is a method using a high subcarrier. 900 shows a case where a gap symbol 904 in which no control information or data information is transmitted exists between the first sidelink channel and the second sidelink channel. As described above, since a gap symbol has a length of less than 25 μs in a subcarrier spacing of 60 kHz or greater, the structure of transmitting and receiving sidelink control and data channels illustrated in FIG. 7 may be used.

Method 1-2 is a method of copying the last symbol of the first sidelink channel to the gap symbol. 910 shows a structure in which the first sidelink channel 912 is copied to be repeatedly transmitted in 914. Accordingly, it may be possible to eliminate a gap between the first sidelink channel and the second sidelink channel.

Method 1-3 is a method of copying the first symbol of the second sidelink channel into a gap symbol. 920 shows a structure in which the second sidelink channel 926 is copied to be repeatedly transmitted in 924. Accordingly, it may be possible to eliminate a gap between the first sidelink channel and the second sidelink channel.

Method 1-4 is a method of performing CP extension of the last symbol of the first sidelink channel to make a gap symbol 25 μs. Referring to 930, a portion of the first sidelink channel 932 may be copied to be mapped to 938. The length of 938 may be a value to make the length of 934 within 25 μs, and specifically, (length of 938)=(length of one symbol)−μs. Copying the portion of the first sidelink channel may mean extending a cyclic prefix (CP) of 932, in which a portion corresponding to the CP in an OFDM symbol may be copied and mapped to 938. Since a gap between the first sidelink channel and the second sidelink channel is within 25 μs, the channel access method of type 2 or the channel access method of type 3 may be used.

Method 1-5 is a method of performing CP extension of the first symbol of the second sidelink channel to make a gap symbol 25 μs. Referring to 940, a portion of the second sidelink channel 946 may be copied to be mapped to 948. The length of 948 may be a value to make the length of 944 within 25 μs, and specifically, (length of 948)=(length of one symbol)−25 μs. Copying the portion of the second sidelink channel may mean extending a CP of 946, in which a portion corresponding to the CP in an OFDM symbol may be copied and mapped to 948. Since a gap between the first sidelink channel and the second sidelink channel is within 25 μs, the channel access method of type 2 or the channel access method of type 3 may be used.

Method 1-6: A combination of method 1-2 to method 1-5 may be considered. That is, a portion of the first sidelink channel 952 may be copied and mapped to a first half of a slot 954, or a CP of the first sidelink channel 952 may be extended and mapped to the first half of the slot 954 so that a gap becomes 0 μs rather than within 25 μs. Further, a portion of the second sidelink channel 956 may be copied and mapped to a second half of the slot 954, or a CP of the second sidelink channel 956 may be extended and mapped to the second half of the slot 954. Through method 1-6, the UE may perform channel access of type 3 before transmitting the second sidelink channel.

Among the foregoing methods 1-1 to 1-6, the sidelink UE may use one method, may apply a method configured by an higher signal (RRC, MAC CE) or L1 signal (PDCCH or DCI) received from a base station among a plurality of methods, or may use a preconfigured method. Alternatively, one of the foregoing methods may be selected by an higher signal (PC5 RRC) or L1 signal (PSCCH or SCI) transmitted by the sidelink UE. Alternatively, different methods may be used depending on subcarrier spacing. For example, method 1-1 may be applied in a subcarrier spacing of 60 kHz and greater, and at least one of method 1-2 to method 1-6 may be applied in a subcarrier spacing of 15 or 30 kHz. Alternatively, different methods may be selected depending on a cast type, such as unicast, group cast, or broadcast.

A channel access procedure (hereinafter, a frame-based channel access procedure or an FBE-based channel access procedure) in a case where a channel access procedure initiation time of a communication device is fixed (frame-based equipment: FBE) will be described with reference to FIG. 10.

Figure 10:
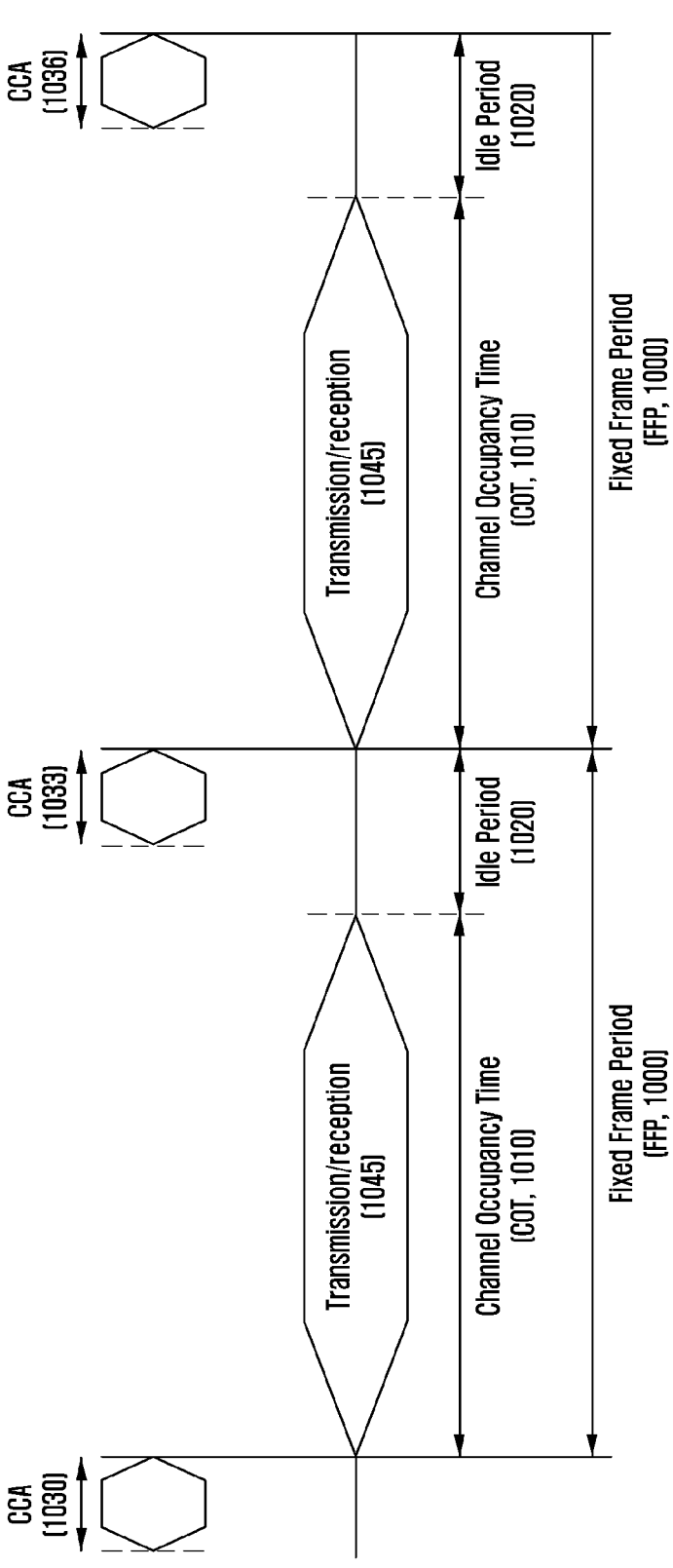
FIG. 10 illustrates a channel access procedure in an unlicensed band in a wireless communication system according to various embodiments of the disclosure.

FIG. 10 illustrates a channel access procedure in an unlicensed band in a wireless communication system according to various embodiments of the disclosure.

A communication device performing a frame-based channel access procedure may periodically transmit and receive a signal according to a fixed frame period (FFP). The fixed frame period 1000 may be declared or configured by the communication device (e.g., a base station), and may be configured from 1 ms to 10 ms. The channel access procedure (or clear channel access: CCA) in the unlicensed band may be performed immediately before each frame period 1030, 1033, and 1036 starts, and may be performed for a fixed time or one observation slot as in the foregoing channel access procedure of type 2. When the unlicensed band is determined to be idle or as an idle channel as a result of the channel access procedure, the communication device may transmit and receive a signal for up to 95% (hereinafter, channel occupancy time: COT 1010) of the fixed frame period 1000 without performing any channel access procedure (1045). Here, a minimum time of 5% of the fixed frame period 1000 is an idle period 1020, in which no signal is transmitted and received, and a channel access procedure may be performed within the idle period 1020. Alternatively, when the minimum time of 5% is 100 μs or less, 100 μs of the fixed frame period 1000 is the idle period 1020, in which no signal is transmitted and received.

Compared to a traffic-based channel access procedure, the frame-based channel access procedure has advantages in that a method for performing the channel access procedure is relatively simple and channel access in the unlicensed band may be periodically performed. However, the frame-based channel access procedure has a fixed channel access procedure initiation time, and thus has a lower probability of accessing the unlicensed band than the traffic-based channel access procedure.

A UE configured or instructed to transmit an uplink signal or channel (e.g., at least one of a PUCCH, a PUSCH, an SRS, and a PRACH) through the unlicensed band needs to perform a channel access procedure before a first symbol in which transmission of the uplink signal or channel is configured or instructed. The UE may perform a channel access procedure of type 2 or type 3 according to the size of a gap between a start time of the uplink signal or channel the UE is configured or instructed to transmit and an end time of an uplink/downlink signal or channel before the start time, and may transmit the configured or instructed uplink signal or channel. For example, when the size of the gap between the start time of the uplink signal or channel the UE is configured or instructed to transmit and the end time of the uplink/downlink signal or channel before the start time is 25 μs, the UE may perform a channel access procedure of type 2 for 25 μs. In another example, when the size of the gap between the start time of the uplink signal or channel the UE is configured or instructed to transmit and the end time of the uplink/downlink signal or channel before the start time is equal to or less than 16 μs, the UE may perform the channel access procedure of type 2 channel access procedure for 16 μs, or may perform a channel access procedure of type 3.

In addition, since transmission of an uplink/downlink signal or channel in a general LTE or NR system is performed by a unit of a symbol, the size of the gap may be greater than 25 μs. For example, when uplink/downlink communication is performed with a subcarrier spacing of 15 one or more symbols. For example, in a symbol 1-1 immediately before an uplink transmission start symbol 1 configured or indicated for uplink transmission, the entire uplink transmission start symbol 1 is cyclically extended and transmitted, and in a previous symbol 1-2, a cyclically extended signal or channel of the uplink transmission start symbol 1 configured or indicated for uplink transmission (or duplicated symbol 1-1) may be transmitted. The entire uplink transmission start symbol 1 being cyclically extended and transmitted in the symbol 1-1 immediately before the uplink transmission start symbol 1 configured or indicated for uplink transmission may mean that the uplink transmission start symbol 1 is duplicated and transmitted in the symbol 1-1 or the uplink transmission start symbol 1 is transmitted or retransmitted in the symbol 1-1.

An example of cyclic extension is described as follows. When a first OFDM symbol 1 allocated for configured or indicated transmission of an uplink signal or channel is cyclically extended, a time-continuous signal in a time period of $T_{symb,l}^{\mu}-T_{ext} \leq t < T_{symb,l}^{\mu}$ the first symbol may be expressed by Equation 1.

$$s_{l-1}^{(p,\mu)} = -s_l^{(p,\mu)}(t-N_{CP,l}^{\mu}T_c)$$

$$T_{symb,l}^{\mu}-T_{ext} \leq t < T_{symb,l}^{\mu}$$

$$T_{symb,l}^{\mu} = (N_u^{\mu}-N_{CP,l}^{\mu})T_c \qquad \text{[Equation 1]}$$

$s_l^{(p,\mu)}$ is a time-continuous signal in OFDM symbol 1, antenna port p, and subcarrier spacing μ. Text is illustrated below in Table 2, and TTA may be a timing advance (TA) applied by the UE in configured or indicated uplink transmission. Equation 1 is only an example of cyclic extension, and the disclosure is not limited to Equation 1. In Table 2, C2 and C3 are integer values including at least 1 and 2, and may be predefined between the base station and the UE, or may be configured for the UE through an higher signal. C2 and C3 may be defined as $C2=\text{ceiling}(16 \ \mu s+T_{TA}/T_{symb,l}^{\mu})$ and $C3=\text{ceiling}(25 \ \mu s+T_{TA}/T_{symb,l}^{\mu})$. Table 2 is an example of expressing a cyclic extension period, but the disclosure is not limited thereto.

TABLE 2

| Index | μ = 0 | μ = 1 | μ = 2 |
|---|---|---|---|
| 0 | 0 | 0 | 0 |
| 1 | $T_{symb,l}^{\mu} - 25 \cdot 10^{-6}$ | $T_{symb,l}^{\mu} - 25 \cdot 10^{-6}$ | $T_{symb,l}^{\mu} - 25 \cdot 10^{-6}$ |
| 2 | $C_2T_{symb,l}^{\mu} - 16 \cdot 10^{-6} - T_{TA}$ $C_3T_{symb}^{\mu}$ $25 \cdot 10^{-6} - T_{TA}$ | $C_2T_{symb,l}^{\mu} - 16 \cdot 10^{-6} - T_{TA}$ $C_3T_{symb}^{\mu}$ $25 \cdot 10^{-6} - T_{TA}$ | $C_2T_{symb,l}^{\mu} - 16 \cdot 10^{-6} - T_{TA}$ $C_3T_{symb}^{\mu}$ $25 \cdot 10^{-6} - T_{TA}$ | kHz, the length of one symbol is approximately 72 μs, which may be greater than the size of a gap period for performing the channel access procedures of type 2 and type 3. Therefore, a base station or a UE may transmit an uplink/downlink signal or channel in a time (e.g., from symbol length—needed gap length to end time of symbol) within a symbol to provide a gap of a certain time.

A signal or channel transmitted in some time of a symbol may be an extended cyclic prefix (CP) for an uplink transmission start symbol configured or indicated by the base station for the UE, a signal or channel in which the transmission start symbol is entirely or partly duplicated, or a signal or channel in which the transmission start symbol is entirely or partly subjected to cyclic prefix extension. Hereinafter, for convenience of explanation, the term "cyclic prefix extension" or "CP extension" is in the disclosure. A cyclically extended signal or channel may be transmitted in Within channel occupancy initiated by the base station and shared by the UE, the following operations should be followed.

The base station should perform downlink transmission first in a channel occupancy period immediately after a channel is detected as an idle state during a sensing period of at least 9 μs. When the channel is detected as busy, the base station does not perform any transmission during the channel occupancy period.

When a gap between consecutive downlink transmission period is 16 μs or greater, the base station may perform downlink transmission within the channel occupancy period immediately after the channel is detected as idle during the sensing period of at least 9 us.

When a gap between a downlink transmission period and an uplink transmission period is a maximum of 16 μs, the base station may perform downlink transmission after the uplink transmission period without channel sensing.

In a case where the UE performs uplink transmission after retrieving a downlink transmission period transmitted from the base station within the channel occupancy period, when a gap between uplink transmission periods exceeds 16 us, and when a channel sensed for at least 9 us within 25 μs immediately before the UE performs uplink transmission is idle, the UE performs uplink transmission. When the gap is within a maximum of 16 us, the UE may perform uplink transmission after the downlink transmission period without channel sensing.

The base station and the UE do not perform any transmission within an idle period 1020 before the start of a next channel occupancy period. The idle period is determined as a larger value of 0.05*FFP and 100 μs. The FFP is one value from 1 ms to 20 ms, and is preconfigured via an higher signal.

When the UE fails to access the channel before uplink transmission to the base station, L1 reports channel failure information as an higher signal.

First Embodiment

Hereinafter, a configuration method for supporting frame-based channel access in a sidelink environment will be described.

As described above, in a frame-based channel access method, a period may be configured, and there may be an idle duration in which no signal transmission or reception is allowed for a certain period within the period (fixed frame period: FFP). The length of the idle duration may be determined as a larger value of 0.05*FFP and 100 μs. For example, Table 3 illustrates the length of the idle duration according to various FFP lengths.

TABLE 3

| FFP (ms) | Idle duration (ms) |
|----------|--------------------|
| 1 | 0.1 |
| 2 | 0.1 |
| 2.5 | 0.125 |
| 4 | 0.2 |
| 5 | 0.25 |
| 10 | 0.5 |

In Table 3, except for the idle duration in a case where the FFP is 1 ms, the duration of the idle duration occupy 5% of the FFP. When the FFP is 1 ms, the duration of the idle duration occupies 10% of the FFP. FFP information and the idle duration may be determined by Table 3, and a start point (or offset) of the FFP may be determined by a frame number, a subframe number, a slot number, or a combination thereof, or the FFP may be repeated from a start point of a specific frame number, a start point of a subframe number, or a start point of a slot number according to the frame structure described above with reference to FIG. 5. Alternatively, the offset of the FFP may be a number from a start of an even indexed radio frame in which a UE may start channel occupancy to a start of a first period within the radio frame, based on a smallest SCS among SCSs configured in a serving cell. In addition, an indicated offset value may be smaller than a period value, and a maximum offset value is 279, 559, and 1119 at subcarrier spacing of 15 kHz, 30 kHz, and 60 kHz, respectively, and is in a unit of slot. That is, when the frame-based channel access method is configured for a UE performing sidelink communication in an unlicensed band, the UE may receive an FFP for occupying a channel in frame-based channel access and offset information about the FFP. The FFP and the offset information may be configured and transmitted in a set, or may be configured in a plurality of set values, among which one value may be selected. For example, a set of the FFP and the offset information may be received as two sets of information, such as (period, offset)={(1 ms, 1), (2 ms, 2)}, and the UE may determine one of the received sets. A method for determining one of the sets may be at least one of the following methods.

Method 2-1: Determination may be performed based on geographic information. The sidelink communication UE may determine location information thereof by receiving the location information thereof from a neighboring UE or a base station or by autonomously calculating the location information. The UE may select one of a plurality of sets of an FFP and offset information according to the location information thereof. A criterion for selection may be transmitted in advance through an higher signal, or may be autonomously determined by the UE. For example, it is possible to instruct, through higher signal information, the UE to select an FFP structure with (1 ms, 1) when the UE is located in area A, and to select an FFP structure with (2 ms, 2) when the UE is located in area B.

Method 2-2: Determination may be performed based on the S-SSB ID. The sidelink UE may receive a sidelink synchronization signal block (S-SSB) transmitted by a different sidelink UE, and may determine an FFP structure according to ID information detected from the S-SSB. A mapping relationship between a specific ID and an FFP structure may be transmitted in advance through an higher signal, or may be autonomously determined by the UE.

Method 2-3: Determination may be performed based on an ID given to the UE. The sidelink communication UE may be given, through an higher signal, ID information with which the UE operates in sidelink communication in the unlicensed band. The ID may be a transmission ID, a reception ID, or a group ID. The UE may determine an FFP structure according to the given ID. A mapping relationship between a specific ID and an FFP structure may be transmitted in advance through an higher signal, or may be autonomously determined by the UE.

It is common for separate UEs to operate in a situation with the same FFP structure. However, when the respective UEs have different pieces of FFP information as described above, the UEs may need to exchange the pieces of FFP information managed by the respective UEs. This is because when part of a channel occupied by UE-A is given to UE-B, the channel needs to be prevented from being shared in an idle duration of UE-B. Therefore, UE-A and UE-B may share pieces of configured FFP information with each other through an higher signal or an L1 signal.

Second Embodiment

Hereinafter, an operation of a UE performing sidelink communication in an unlicensed band in a case of an overlap with an idle duration will be described.

A UE performing sidelink communication in an unlicensed band according to the FFP structure of FIG. 10 is not allowed to transmit a signal in an idle duration. Therefore, when a specific sidelink physical channel overlaps with an idle duration as in the following cases, the UE may consider a method for avoiding the overlap.

Case 1-1: Where a PSFCH to be transmitted by UE-A overlaps with an idle duration of UE-A. The PSFCH is a feedback channel through which UE-A transmit a reception result of a PSSCH transmitted by UE-B. Therefore, a transmission resource for the PSFCH may be determined in advance by UE-B transmitting the PSSCH. When UE-B does not know FFP information about UE-A, the transmission resource for the PSFCH to be transmitted by UE-A may overlap with the idle duration of UE-A. In this case, UE-A may not transmit the PSFCH. Alternatively, UE-A may transmit the reception result of the PSSCH to UE-B by using a PSCCH, a PSSCH, or a different PSFCH resource.

Case 1-2: When a PSCCH or PSSCH to be transmitted by UE-A overlaps with an idle duration of UE-A, the UE may not transmit the PSCCH or PSSCH. Specifically, when at least some symbols of PSCCH or PSSCH resources overlap with the idle duration, the UE may not transmit only a portion overlapping with the idle duration, or may not transmit all transmission resources.

Case 1-3: Where an S-SSB overlaps with an idle duration. When the S-SSB periodically transmitted and received by UE-A overlaps with the specific idle duration in an FFP configured for UE-A, the UE may not transmit the S-SSB. Alternatively, since the S-SSB is a synchronization channel unlike other physical channels, UE-A may transmit the S-SSB without considering whether the S-SSB overlaps with the idle duration.

Case 1-4: While the foregoing cases define UE operations in a situation where a specific sidelink physical channel overlaps with an idle duration in an FFP, case 1-4 is a method for allocating a resource to avoid an overlap with an idle duration from the beginning. According to case 1-4, a UE (or base station) that allocates a PSFCH resource, a UE (or base station) that allocates a PSCCH/PSSCH resource, and a UE (or base station) that allocates an S-SSB resource may allocate the PSFCH resource, the PSCCH/PSSCH resource, or the S-SSB resource so as not to overlap with an idle duration of a UE (e.g., UE-A) that actually transmits a corresponding channel.

Third Embodiment

Hereinafter, a sidelink channel structure in a case where subcarrier spacing of a UE performing sidelink communication in an unlicensed band is 15 kHz and an FFP is 1 ms will be described.

Figure 11:
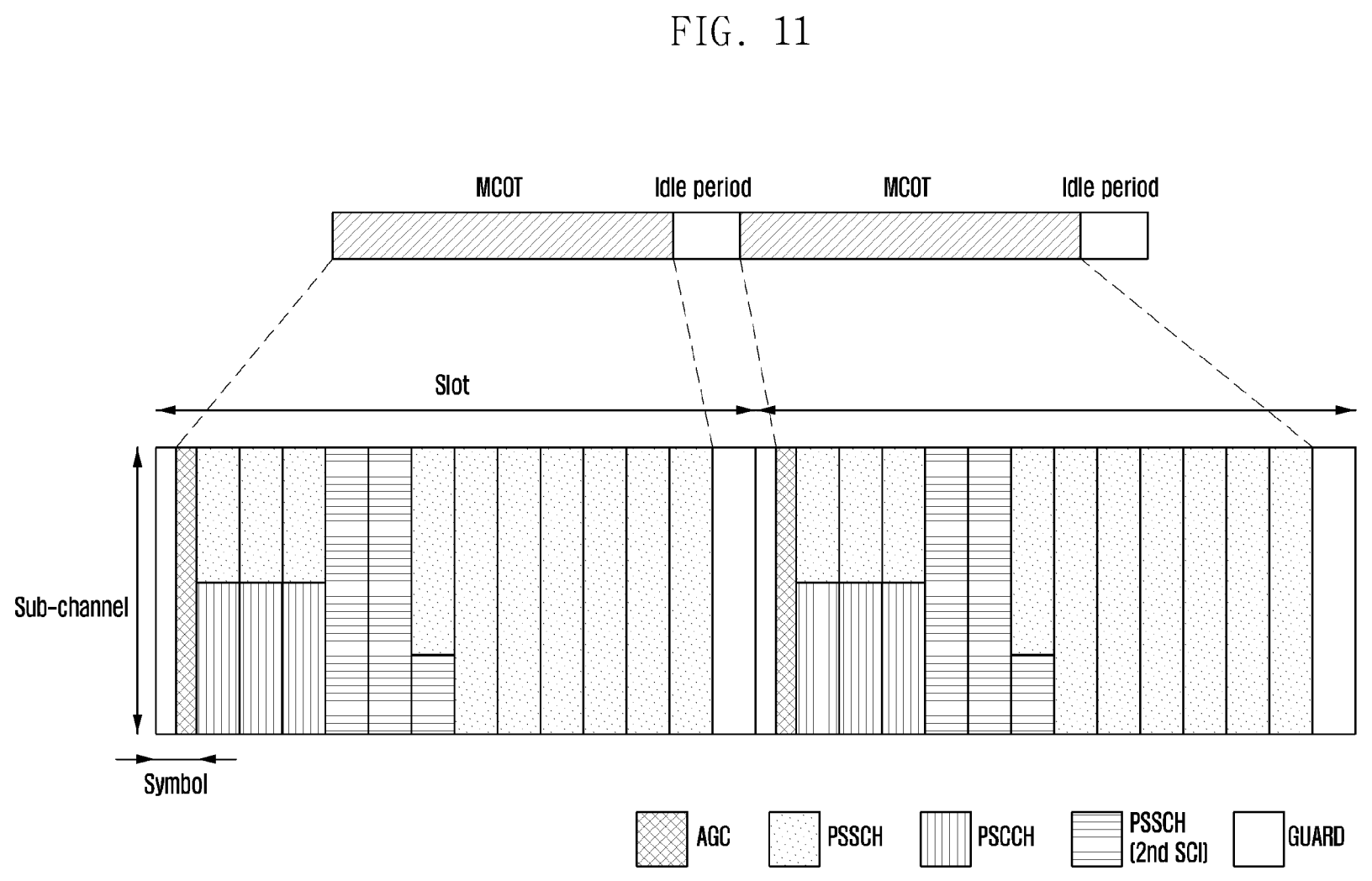

As described in FIG. 7, a sidelink physical channel structure in a licensed band includes AGC, PSCCH, PSSCH, and GUARD symbols, and may include a PSFCH symbol. A GUARD symbol includes one symbol, and is about 71 μs based on 15 kHz, in which a sidelink UE does not perform data transmission. It may be possible to consider supporting frame-based channel access in an unlicensed band by reusing this structure as much as possible. For example, when an FFP period is 1 ms, 100 μs is an idle duration, and thus the GUARD symbol of FIG. 7 may be configured by adding about 0.5 symbols in addition to one symbol. That is, the last GUARD symbol may be designed to be configured to be 100 μs. In this case, a slot may be formed to have a length larger than 1 ms. Alternatively, instead of forming the last symbol of 100 μs, it may be possible to reduce the length of a symbol other than the GUARD symbol in the slot. In another example, as illustrated in FIG. 11, a design may be possible in which an AGC symbol forming a first symbol of a slot is reduced from 71 μs to about 40 μs and remaining 30 μs is mapped to an idle duration while maintaining an existing GUARD symbol of one symbol having a length of about 71 us. Therefore, considering a consecutive slot structure, last 71 μs of a slot and first 30 μs of a next slot are not used for data transmission, and may thus be designed to correspond an idle duration of 100 μs. Accordingly, offset information about an FFP may be indicated to the UE through an upper signal not only to indicate a value in a unit of slot but also to enable fine adjustment in a unit of symbol or in a unit of subsymbol, and thus the UE may use a sidelink channel structure illustrated in FIG. 11. For example, in addition to a conventional number in a unit of slot, an absolute length value, such as 30 us, may be added to an offset value of the FFP. Further, the absolute length value may have a different value depending on subcarrier spacing. In another example, when a PSFCH exists, a PSFCH resource may be mapped to one symbol or two symbols existing immediately before an idle duration without a separate GUARD symbol added, and be transmitted or received therein.

Fourth Embodiment

Hereinafter, a sidelink channel structure in a case where subcarrier spacing of a UE performing sidelink communication in an unlicensed band is 30 kHz and an FFP is 1 ms will be described.

In the third embodiment, since the subcarrier spacing is 15 kHz, it is easy to map some symbols to the idle duration according to the 1-ms slot structure. However, when the subcarrier spacing is 30 kHz, since the length of one slot is 0.5 ms, the length of two slots may be mapped to an FFP period of 1 ms. In this situation, the existing structure of FIG. 7 is unable to be reused to consecutively configure 100-μs idle durations. Therefore, a new sidelink channel structure operating in an unlicensed band when the subcarrier spacing is 30 kHz and the FFP is 1 ms may be needed.

Figure 12:
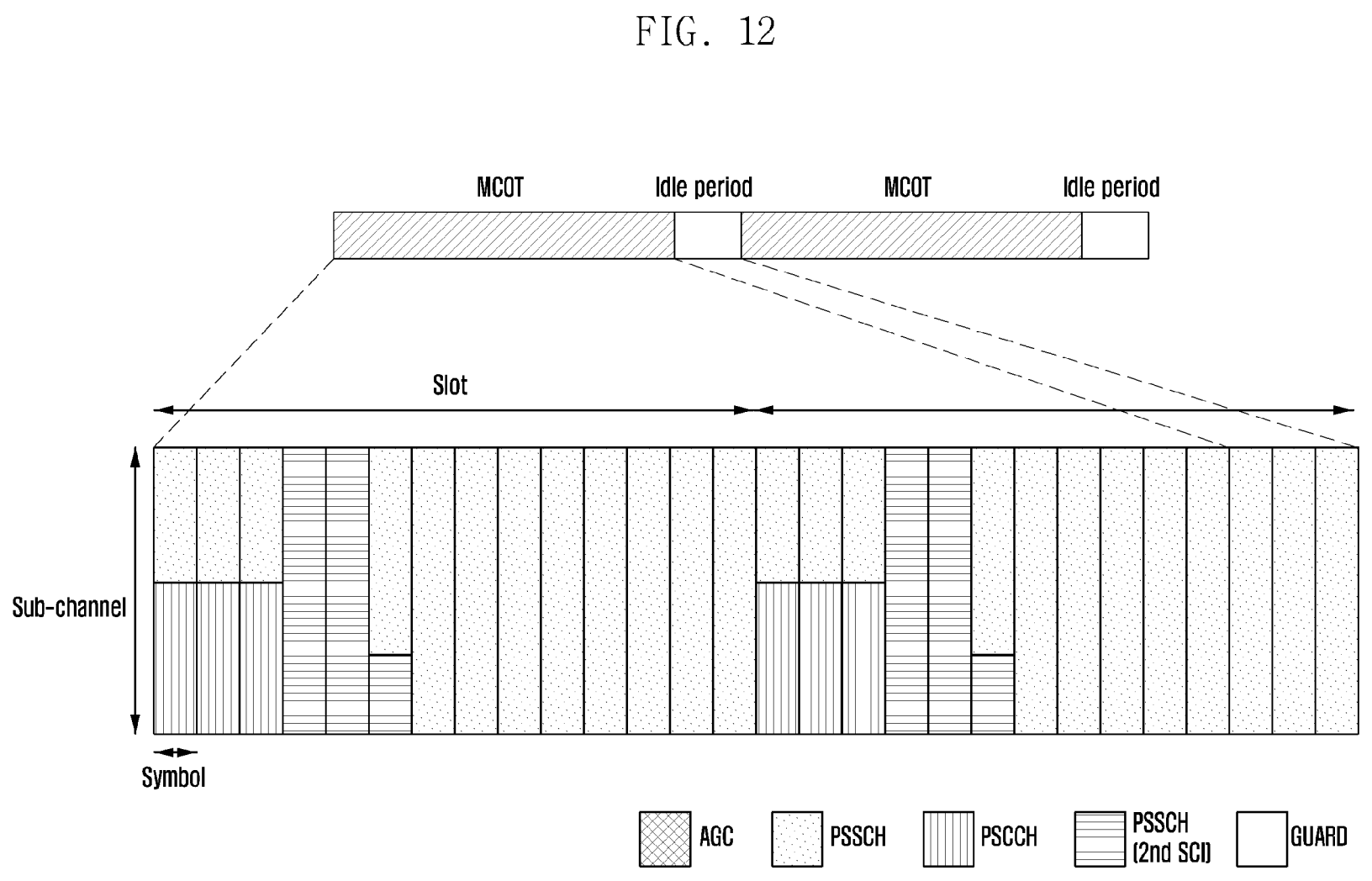

FIG. 12 illustrates a sidelink structure operating in a frame-based channel access method according to an embodiment of the disclosure.

When two slots are contiguous, a first slot does not have a GUARD symbol, and last three symbols of a second slot may be used as GUARD symbols. When the subcarrier spacing is 30 kHz, one symbol is about 36 us, at least three symbols should be used as an idle duration of an FFP. Therefore, as illustrated in FIG. 12, the FFP may be configured in a unit of two slots, in which case last three symbols may be used as the GUARD symbols. Although physical channels are mapped in an order of first control information, first data information, second control information, and second data information in FIG. 12, physical channels may be mapped in an order of the first control information, the second control information, the first data information, and the second data information. Further, in FIG. 12, an AGC symbol described in FIG. 7 may be disposed in a front part of a first slot. Alternatively, instead of using three symbols of a second slot of the two slots, first one symbol of the first slot may be used as a GUARD symbol, and last two symbols of the second slot may be used as GUARD symbols. Even though the first one symbol of the first slot and the last two symbols of the second slot are used as the GUARD symbols, the three symbols are consecutively present as the GUARD symbols in a consecutive slot structure, and may thus be mapped to the idle duration of the FFP. Unlike the third embodiment, when configuring offset information about the FFP, it may be possible to additionally adjust an offset by adding symbol unit information in addition to slot unit information.

Fifth Embodiment

Hereinafter, a sidelink channel structure in a general situation in which sidelink communication is performed in an unlicensed band will be described.

While a sidelink physical channel structure for a special case corresponding to a specific FFP and subcarrier spacing has been described in the third and fourth embodiments, a more general case will be described in a fifth embodiment. In a frame-based channel access method, as described above, there may be various lengths depending on an FFP and a minimum requirement for an idle duration. Therefore, it may be difficult to configure a PSCCH, a PSSCH, or a PSFCH not to be allocated to the idle duration in consideration of all cases. Therefore, when a transmission UE transmits data, based on the sidelink physical channel structure operating in the licensed band described in FIG. 7, it may be possible to notify a reception UE of an idle duration in which a PSCCH/PSSCH or PSFCH is not transmitted. This method may be applied when different FFPs are configured for the transmission UE and the reception UE. This is why when different FFPs are configured for the transmission UE and the reception UE, ranges of idle durations may also be different. For example, a period that is not an idle duration for the reception UE may be an idle duration for the transmission UE. In this case, since the transmission UE is not allowed to transmit and receive data in the idle duration, the reception UE needs to know this information in advance before data reception to accurately know a time resource region where data is transmitted and received. On the contrary, the reception UE may or may not receive data in a period that is an idle duration for the reception UE but is not an idle duration for the transmission UE. Alternatively, the transmission UE may identify information about an idle duration range of the reception UE at least in advance, and may perform allocation while avoiding the idle duration range in data scheduling. Although the last symbol is used as a GUARD symbol in the sidelink physical channel illustrated in FIG. 7, it may be possible to operate a sidelink physical channel in consideration of a structure to which at least one of the methods illustrated in FIG. 9 is applied. The transmission UE may transmit information about an idle duration to the reception UE through UE-common control information or UE-specific control information.

The UE-common control information is information transmitted to a plurality of UEs, and may indicate a channel period (COT) occupied by the transmission UE. This information may enable the reception UE to indirectly determine the range of the idle duration through the COT, because the idle duration is not included when the transmission UE configures the COT. Thus, scheduled information other than the COT may be determined for the reception UE as invalid information. Alternatively, when PSSCHs include a boundary of the COT, data may be received by determining that only a PSSCH included in the COT is a valid resource. Alternatively, when calculating a TBS, a UE may calculate the TBS considering a PSSCH resource indicated by scheduling, or may calculate the TBS considering only PSSCH information present in the actual COT.

The UE-specific control information is information transmitted to a specific UE, and the transmission UE may accurately report a time resource region in which the reception UE receives data through the UE-specific control information when scheduling data. Therefore, even though not obtaining COT information, the reception UE may determine time resource information about a PSSCH used for actual data transmission and reception through SCI transmitted and received on a PSCCH. Therefore, the reception UE may transmit and receive data according to the SCI scheduled by the transmission UE.

When both a UE-common control information method and a UE-specific control information method are available, the transmission UE or a UE (or base station) that delivers system information within the unlicensed band may transmit a separate signal indicating which of the UE-common control information method and the UE-specific control information method is applied.

In another example, when the same FFP is configured for the transmission UE and the reception UE, the transmission UE and the reception UE are able to know each other's idle duration ranges, and thus the reception UE may implicitly determine that there is no scheduled PSCCH/PSSCH resource in an idle duration instead of the transmission UE separately reporting idle duration information. Therefore, when scheduling a PSSCH, the transmission UE may avoid the idle duration, or may schedule the PSSCH including the idle duration. When the PSSCH is scheduled including the idle duration, the reception UE may assume that PSSCH symbols included in the idle duration are not actually scheduled by the transmission UE. Further, the size of a resource region for calculating the size of a TBS allocated to the PSSCH may be determined based on a scheduled PSSCH resource region including the idle duration or based on a PSSCH resource region that is actually transmitted and received except for the idle duration. One of the foregoing methods may be determined in advance, or one of the two methods may be determined through an upper signal.

In addition, when transmitting and receiving a sidelink signals in the unlicensed band through a sidelink transmission and reception resource pool (preconfiguration resource pool), the UE may determine that a slot or symbols overlapping with the idle duration are not included in the sidelink transmission and reception resource pool. Alternatively, the sidelink transmission and reception resource pool may include only a slot or symbols that do not overlap with the idle duration. Therefore, since the idle duration is not included in the sidelink transmission and reception resource pool, the UE does not expect to transmit and receive a sidelink signal in the idle duration. In another example, in a situation where UE A and UE B have different idle durations, a sidelink transmission resource pool may be determined as a time resource including a slot or symbols excluding an idle duration of UE A from a viewpoint of UE A, and may be determined as a time resource including a slot or symbols excluding an idle duration of UE B from a viewpoint of UE B. In still another example, in a situation where UE A and UE B have different idle durations, a sidelink reception resource pool may be determined as a time resource including a slot or symbols excluding the idle duration of UE B from a viewpoint of UE A, and may be determined as a time resource including a slot or symbols excluding the idle duration of UE A from a viewpoint of UE B. In yet another example, in a situation where UE A and UE B have different idle durations, a sidelink transmission and reception resource pool may be determined as a time resource including a slot or symbols excluding the idle duration of UE A from a viewpoint of UE A, and may be determined as a time resource including a slot or symbols excluding the idle duration of UE B from a viewpoint of UE B. In still another example, in a situation where UE A and UE B have different idle durations, a sidelink transmission resource pool may be determined as a time resource including a slot or symbols excluding the idle durations of UE A and UE B from a viewpoint of UE A, and may be determined as a time resource including a slot or symbols excluding the idle durations of UE A and UE B from a viewpoint of UE B. In yet another example, in a situation where UE A and UE B have different idle durations, a sidelink reception resource pool may be determined as a time resource including a slot or symbols excluding the idle durations of UE A and UE B from a viewpoint of UE A, and may be determined as a time resource including a slot or symbols excluding the idle durations of UE A and UE B from a viewpoint of UE B. In still another example, in a situation where UE A and UE B have different idle durations, a sidelink transmission and reception resource pool may be determined as a time resource including a slot or symbols excluding the idle durations of UE A and UE B from a viewpoint of UE A, and may be determined as a time resource including a slot or symbols excluding the idle durations of UE A and UE B from a viewpoint of UE B.

Figure 13:
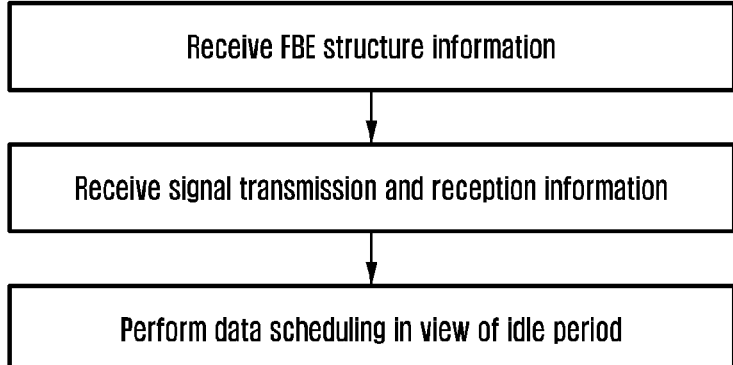
FIG. 13 is a flowchart illustrating a process in which a sidelink UE operates frame-based channel access in an unlicensed band according to an embodiment.

FIG. 13 is a flowchart illustrating a process in which a sidelink UE operates frame-based channel access in an unlicensed band according to an embodiment.

Sidelink UEs may receive upper signal information about a channel access method to operate in an unlicensed band. Alternatively, when there is no separate upper signal information, a specific channel access method may be operated based on preconfiguration information embedded in the UEs. When determining to operate a frame-based channel access method, a sidelink UE may receive period and offset information about an FFP through separate upper signal information. When there is no upper signal information, the period and offset information about the FFP may also be determined based on preconfigured information embedded in the UE. An entity that transmits upper signal information may be another sidelink UE or a base station. A sidelink transmission UE may transmit a signal in view of an idle duration, based on at least one of the foregoing embodiments. A sidelink reception UE may receive a signal in view of an idle duration, based on at least one of the foregoing embodiments.

Figure 14:
FIG. 14 illustrates a structure of a UE according to an embodiment of the disclosure.

FIG. 14 illustrates a structure of a UE according to an embodiment of the disclosure.

Referring to FIG. 14, the UE may include a transceiver, a UE controller, and a storage unit. In the disclosure, the UE controller may be defined as a circuit, an application-specific integrated circuit, or at least one processor.

The transceiver may transmit and receive a signal to and from a different network entity. For example, the transceiver may receive system information from a base station, and may receive a synchronization signal or a reference signal.

The UE controller may control an overall operation of the UE according to an embodiment proposed in the disclosure. For example, the UE controller may control signal flow between blocks to perform an operation according to the foregoing drawings and flowchart. Specifically, the UE controller may operate according to a control signal from the base station, and may exchange a message or signal with a different UE and/or a base station.

The storage unit may store at least one of information transmitted and received through the transceiver and information generated through the UE controller.

Figure 15:
FIG. 15 illustrates a structure of a base station according to an embodiment of the disclosure.

FIG. 15 illustrates a structure of a base station according to an embodiment of the disclosure.

Referring to FIG. 15, the base station may include a transceiver, a base station controller, and a storage unit. In the disclosure, the base station controller may be defined as a circuit, an application-specific integrated circuit, or at least one processor.

The transceiver may transmit and receive a signal to and from a different network entity. For example, the transceiver may transmit system information to a UE, and may transmit a synchronization signal or a reference signal.

The base station controller may control an overall operation of the base station according to an embodiment proposed in the disclosure. For example, the base station controller may control operations proposed in the disclosure to manage and reduce interference with a neighboring base station. Specifically, the base station controller may transmit a control signal to the UE to control an operation of the UE, or may exchange a message or a signal with the UE.

The storage unit may store at least one of information transmitted and received through the transceiver and information generated through the base station controller.

The embodiments of the disclosure described and shown above in the specification and the drawings are merely specific examples that have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived based on the disclosure.

In addition, all or a part of a specific embodiment may be implemented in combination of all or a part of another embodiment, and of course, two or more embodiments implemented in connection with or in conjunction with each other also fall within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:

obtaining one or more configurations for a fixed frame period (FFP) and an offset associated with a frame-based channel access;

identifying a configuration for the FFP and the offset among the one or more configurations based on geographic information of the UE;

identifying an idle duration corresponding to the FFP associated with the configuration; and transmitting a sidelink channel in consideration of the idle duration, wherein the offset is based on an absolute length value in case that a subcarrier spacing of the sidelink channel is 15 kHz and the FFP is 1 ms, wherein the offset is based on a symbol unit value in case that the subcarrier spacing of the sidelink channel is 30 kHz and the FFP is 1 ms, wherein one or more guard symbols are mapped to the idle duration based on the offset, and wherein the sidelink channel is not transmitted on the guard symbols.

2. The method of claim 1, wherein, in case that a first physical sidelink feedback channel (PSFCH) associated with feedback information overlaps with the idle duration, the feedback information is transmitted based on at least one of:

a physical sidelink control channel (PSCCH);

a physical sidelink shared channel (PSSCH); or a second PSFCH, wherein the second PSFCH does not overlap with the idle duration.

3. The method of claim 1, wherein, in case that a physical sidelink control channel (PSCCH) or a physical sidelink shared channel (PSSCH) overlaps with the idle duration, the PSCCH or the PSSCH is not transmitted.

4. The method of claim 1, wherein, in case that a sidelink synchronization signal block (S-SSB) overlaps with the idle duration, the S-SSB is not transmitted.

5. The method of claim 1, wherein, in case that a sidelink synchronization signal block (S-SSB) overlaps with the idle duration, the S-SSB is transmitted.

6. The method of claim 1, wherein a resource for the sidelink channel is allocated so as not to overlap with the idle duration.

7. The method of claim 1, wherein, in case that a subcarrier spacing (SCS) is 15 kHz and the FFP is 1 ms, the FFP is defined based on one slot, and the one slot includes the idle duration, wherein the idle duration is 100 µs.

8. The method of claim 1, wherein, in case that a subcarrier spacing (SCS) is 30 kHz and the FFP is 1 ms, the FFP is defined based on two slots and the two slots include the idle duration, wherein the idle duration is 100 µs.

9. The method of claim 1, further comprising transmitting information on a channel occupancy time (COT), and wherein the idle duration is associated with the information on the COT.

10. A user equipment (UE) in a communication system, the UE comprising:

a transceiver; and a controller operatively coupled to the transceiver configured to:

obtain one or more configurations for a fixed frame period (FFP) and an offset associated with a frame-based channel access;

identify a configuration for the FFP and the offset among the one or more configurations based on geographic information of the UE; and identify an idle duration corresponding to the FFP associated with the configuration, wherein the transceiver is configured to transmit a sidelink channel in consideration of the idle duration, wherein the offset is based on an absolute length value in case that a subcarrier spacing of the sidelink channel is 15 kHz and the FFP is 1 ms, wherein the offset is based on a symbol unit value in case that the subcarrier spacing of the sidelink channel is 30 kHz and the FFP is 1 ms, wherein one or more guard symbols are mapped to the idle duration based on the offset, and wherein the sidelink channel is not transmitted on the guard symbols.

11. The UE of claim 10, wherein, in case that a first physical sidelink feedback channel (PSFCH) associated with feedback information overlaps with the idle duration, the feedback information is transmitted based on at least one of:

a physical sidelink control channel (PSCCH);

a physical sidelink shared channel (PSSCH); or a second PSFCH, wherein the second PSFCH does not overlap with the idle duration.

12. The UE of claim 10, wherein, in case that a physical sidelink control channel (PSCCH) or a physical sidelink shared channel (PSSCH) overlaps with the idle duration, the PSCCH or the PSSCH is not transmitted.

13. The UE of claim 10, wherein, in case that a sidelink synchronization signal block (S-SSB) overlaps with the idle duration, the S-SSB is not transmitted.

14. The UE of claim 10, wherein, in case that a sidelink synchronization signal block (S-SSB) overlaps with the idle duration, the S-SSB is transmitted.

15. The UE of claim 10, wherein a resource for the sidelink channel is allocated so as not to overlap with the idle duration.

16. The UE of claim 10, wherein, in case that a subcarrier spacing (SCS) is 15 kHz and the FFP is 1 ms, the FFP is defined based on one slot, and the one slot includes the idle duration, wherein the idle duration is 100 µs.

17. The UE of claim 10, wherein, in case that a subcarrier spacing (SCS) is 30 kHz and the FFP is 1 ms, the FFP is defined based on two slots and the two slots include the idle duration, wherein the idle duration is 100 µs.

18. The UE of claim 10, wherein the transceiver is further configured to transmit information on a channel occupancy time (COT), and wherein the idle duration is associated with the information on the COT.

* * * * *